(12) United States Patent  
Matsushita et al.

(10) Patent No.: US 11,086,422 B2  
(45) Date of Patent: Aug. 10, 2021

(54) WEARABLE INFORMATION TERMINAL

(71) Applicant: MAXELL, LTD., Kyoto (JP)

(72) Inventors: Mayumi Matsushita, Tokyo (JP); Mitsuru Nagasawa, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/080,313

(22) PCT Filed: Mar. 1, 2016

(86) PCT No.: PCT/JP2016/056305  
§ 371 (c)(1),  
(2) Date: Aug. 28, 2018

(87) PCT Pub. No.: WO2017/149677  
PCT Pub. Date: Sep. 8, 2017

(65) Prior Publication Data  
US 2020/0057513 A1    Feb. 20, 2020

(51) Int. Cl.  
*G09G 5/00* (2006.01)  
*G06F 3/041* (2006.01)  
*G06F 3/0346* (2013.01)  
*G06F 3/0485* (2013.01)  
*G06F 3/0488* (2013.01)  
(Continued)

(52) U.S. Cl.  
CPC ............ *G06F 3/041* (2013.01); *G06F 3/0346* (2013.01); *G06F 3/0485* (2013.01); *G06F 3/04883* (2013.01); *G04G 9/007* (2013.01); *G04G 21/08* (2013.01)

(58) Field of Classification Search  
USPC .............. 345/156, 169, 173, 174, 8; 726/19; 348/47; 715/835  
See application file for complete search history.

(56) References Cited

U.S. PATENT DOCUMENTS

| | | | |
|---|---|---|---|
| 2014/0043440 A1* | 2/2014 | Tang ................. | G02B 27/0093 348/47 |
| 2014/0181750 A1* | 6/2014 | Fujiwara ............. | G06F 3/04886 715/835 |
| 2015/0012877 A1 | 1/2015 | Lee et al. | |

(Continued)

FOREIGN PATENT DOCUMENTS

| JP | 2011-120090 A | 6/2011 |
|---|---|---|
| JP | 4899108 A | 3/2012 |

(Continued)

OTHER PUBLICATIONS

"Samsung Announces its Gear S2 Smartwatch with Bezel-Rotation User Interfaces", IFA, Sep. 2015, Berlin, Germany.

(Continued)

*Primary Examiner* — Thuy N Pardo  
(74) *Attorney, Agent, or Firm* — Mattingly & Malur, PC

(57) ABSTRACT

A wearable information terminal that can be worn by a user is provided with: a main body; a display that is incorporated in the main body and includes a screen; a controller that is incorporated in the main body and executes display processing onto the screen; and an operation detector that detects input operation executed by the user with respect to the controller. The operation detector is disposed at a different position in the main body from the position of the screen.

9 Claims, 33 Drawing Sheets

(51) Int. Cl.
*G04G 9/00* (2006.01)
*G04G 21/08* (2010.01)

(56) References Cited

U.S. PATENT DOCUMENTS

| | | | |
|---|---|---|---|
| 2015/0022438 A1* | 1/2015 | Hong | G06F 3/017 345/156 |
| 2015/0138065 A1* | 5/2015 | Alfieri | G06F 3/011 345/156 |
| 2015/0186030 A1 | 7/2015 | Yoo et al. | |
| 2015/0286246 A1 | 10/2015 | Matsumoto | |
| 2015/0323998 A1* | 11/2015 | Kudekar | G06F 3/014 345/156 |
| 2016/0103985 A1* | 4/2016 | Shim | G06F 3/0346 726/19 |
| 2016/0109953 A1* | 4/2016 | Desh | G06F 3/017 345/169 |
| 2016/0170490 A1* | 6/2016 | Lee | G06F 3/017 345/156 |
| 2016/0195922 A1* | 7/2016 | Lo | G06F 3/0304 345/156 |
| 2016/0239203 A1 | 8/2016 | Sato | |
| 2019/0171165 A1* | 6/2019 | Shim | A61B 5/684 345/173 |
| 2019/0302995 A1* | 10/2019 | Robinson | G06F 3/04847 345/8 |

FOREIGN PATENT DOCUMENTS

| | | |
|---|---|---|
| JP | 2014-123197 A | 7/2014 |
| JP | 2015-41829 A | 3/2015 |
| JP | 2015-87861 A | 5/2015 |
| JP | 2015-127957 A | 7/2015 |

OTHER PUBLICATIONS

International Search Report of PCT/JP2016/056305 dated Mar. 31, 2016.
Japanese Office Action received in corresponding Japanese Application No. 2020-005271 dated Oct. 2, 2020.
Japanese Office Action received in corresponding Japanese Application No. 2020-005271 dated Apr. 20, 2021.

* cited by examiner

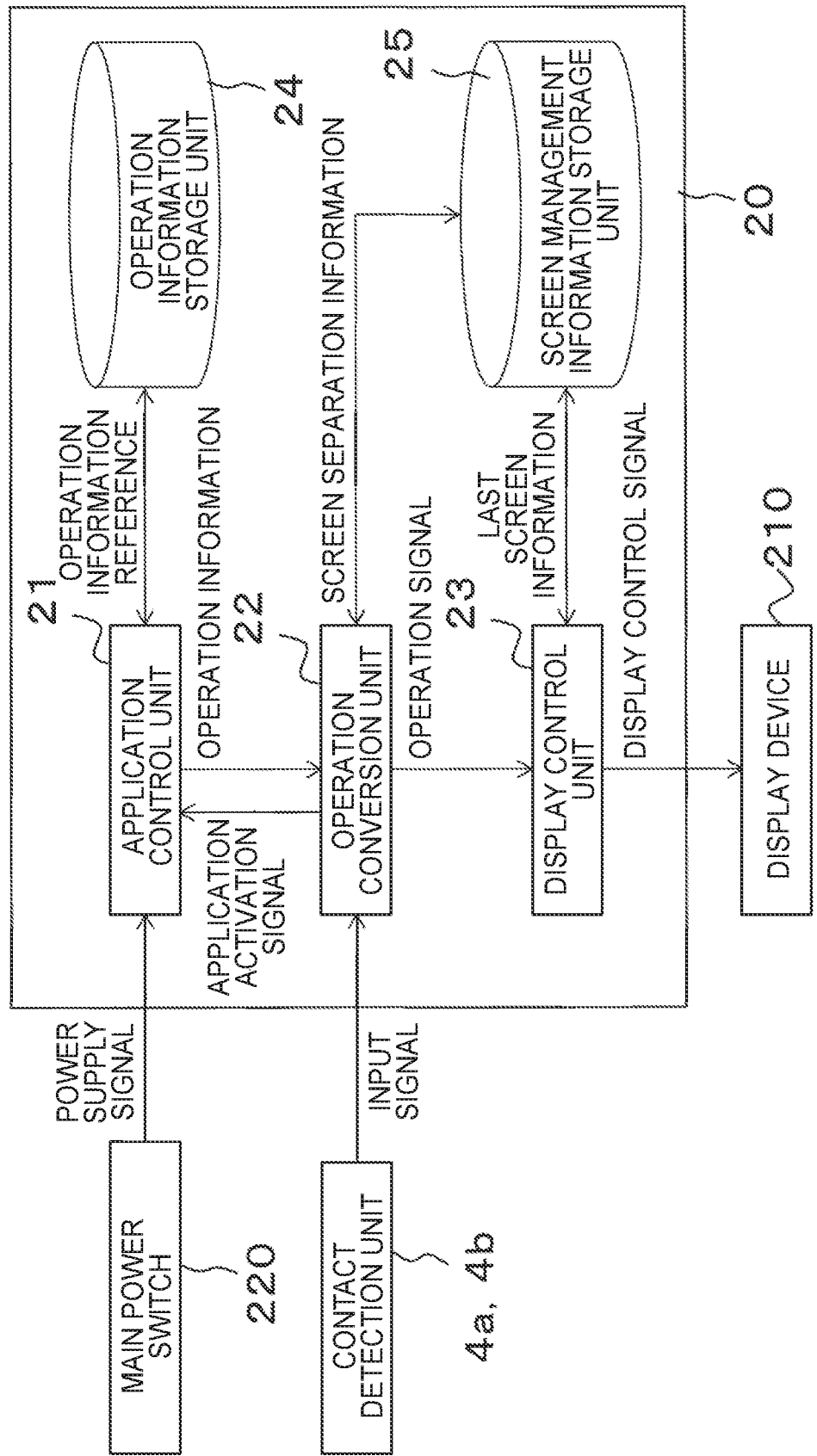

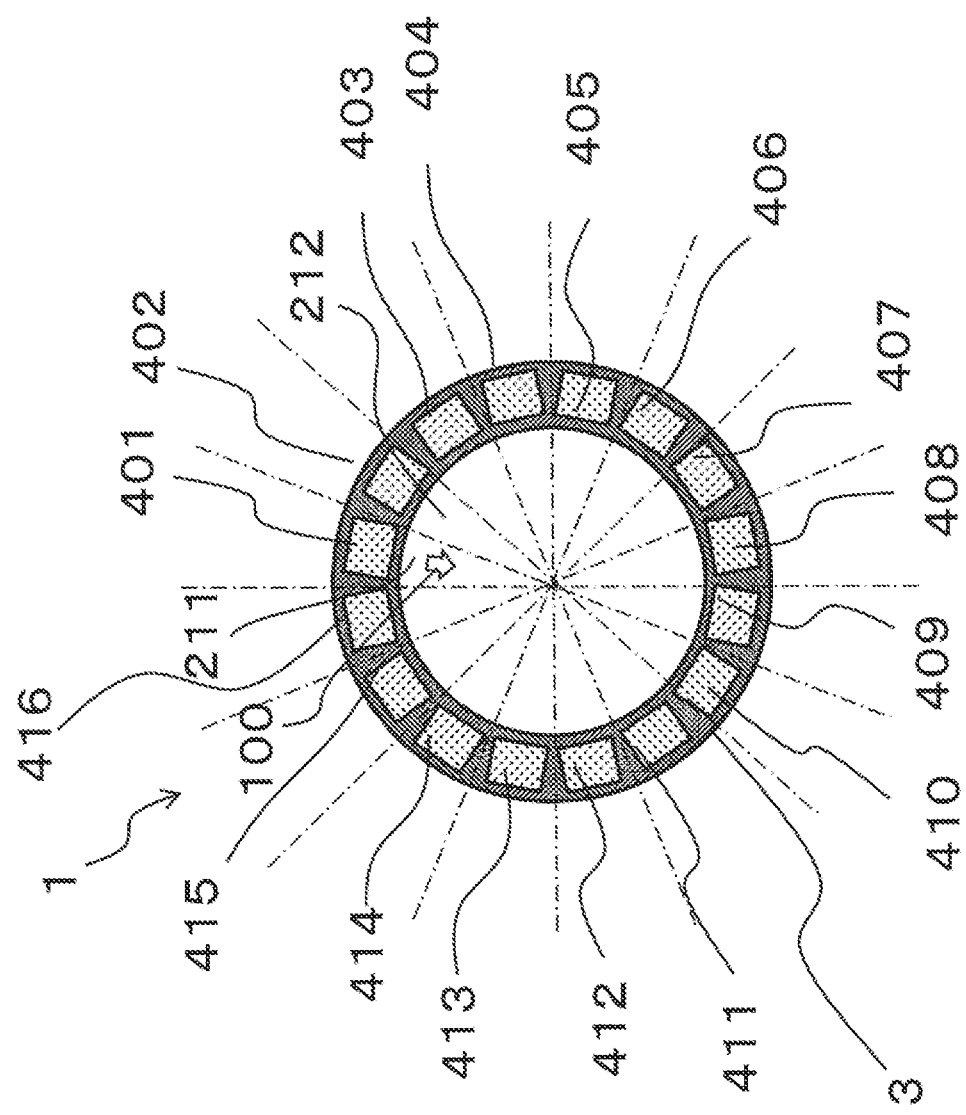

FIG. 8

| APPLICATION | OPERATION | OPERATION CONTENT |
|---|---|---|
| DESKTOP | TRACE FRAME | MOVE POINTER ICON |
| BROWSER | TRACE FRAME IN WIDTH DIRECTION | CHANGE SELECTION SCREEN |
| | TRACE FRAME | OPERATE POINTER ICON |
| | TRACE FRAME | ENLARGE/CONTRACT |
| | PINCH-IN/PINCH-OUT OF FRAME | ENLARGE/CONTRACT |
| MAP | TOUCH TWO AXES OF FRAME SIMULTANEOUSLY | DESIGNATE XY-COORDINATE |
| | TOUCH A PART OF FRAME CORRESPONDING TO INTENDED SCROLL DIRECTION | SCROLL |
| TELEPHONE/ELECTRONIC CALCULATOR | FRAME TOUCH POSITION+TOUCH | INPUT NUMERIC KEY |
| E-MAIL | TRACE FRAME | SCROLL |
| MUSIC/MOTION PICTURE | TRACE FRAME | OPERATE BAR OF CONTROLLER |
| OS | TOUCH ACROSS SCREEN VERTICALLY/HORIZONTALLY | RETURN MOTION |
| OS | DOUBLE TAP | RETURN MOTION |

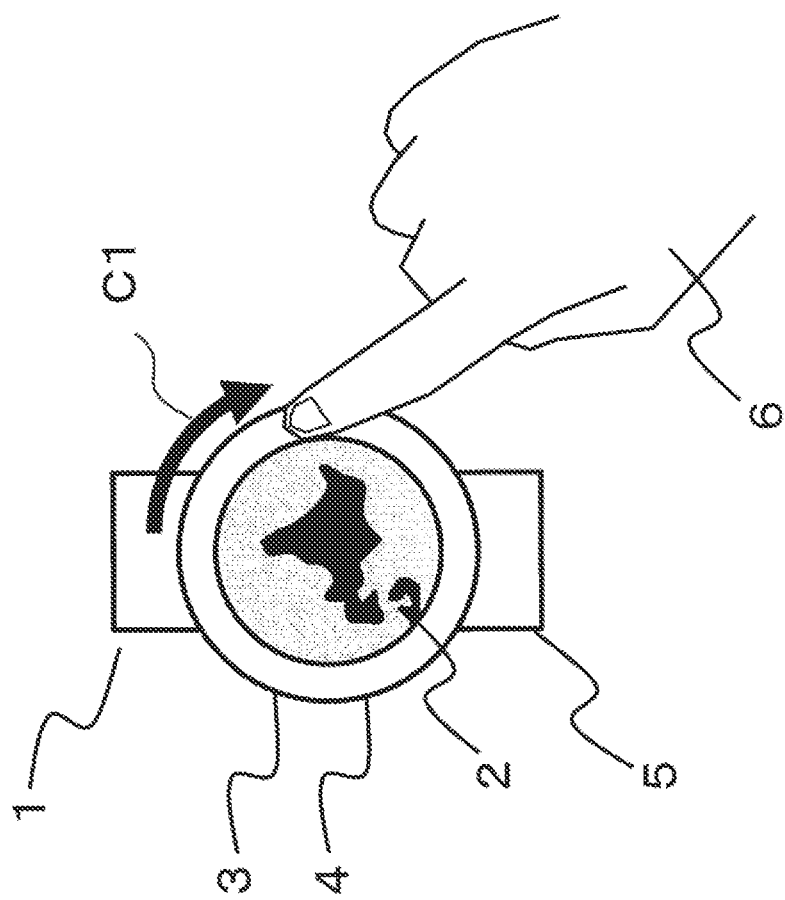
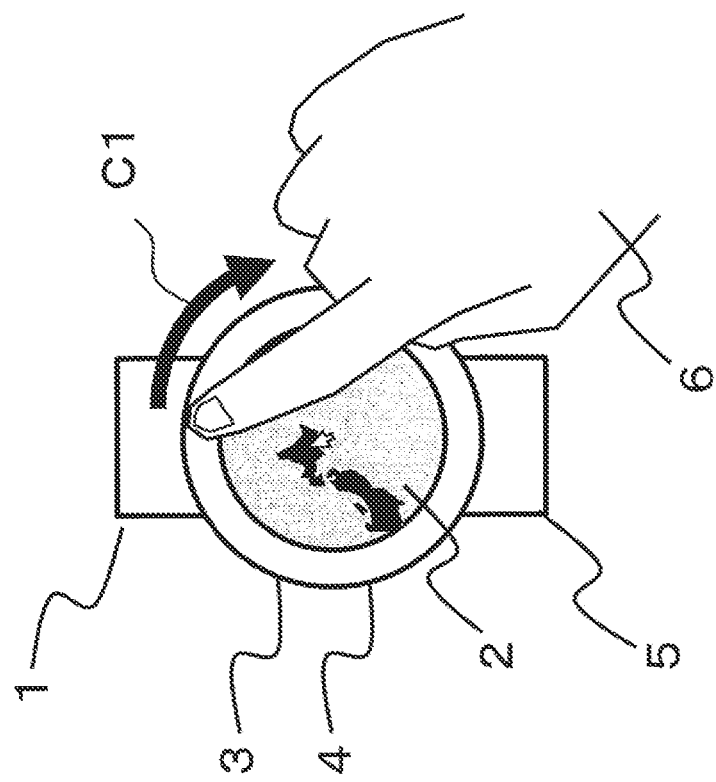

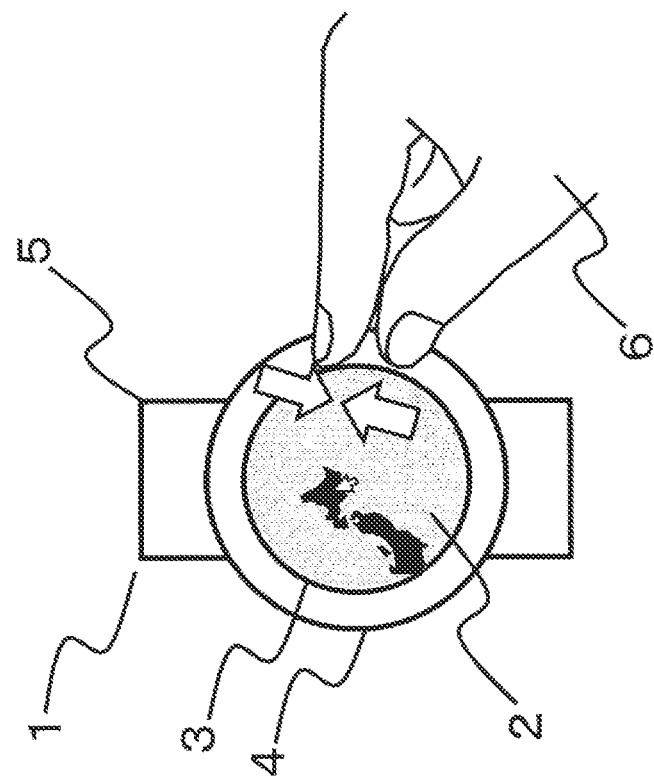
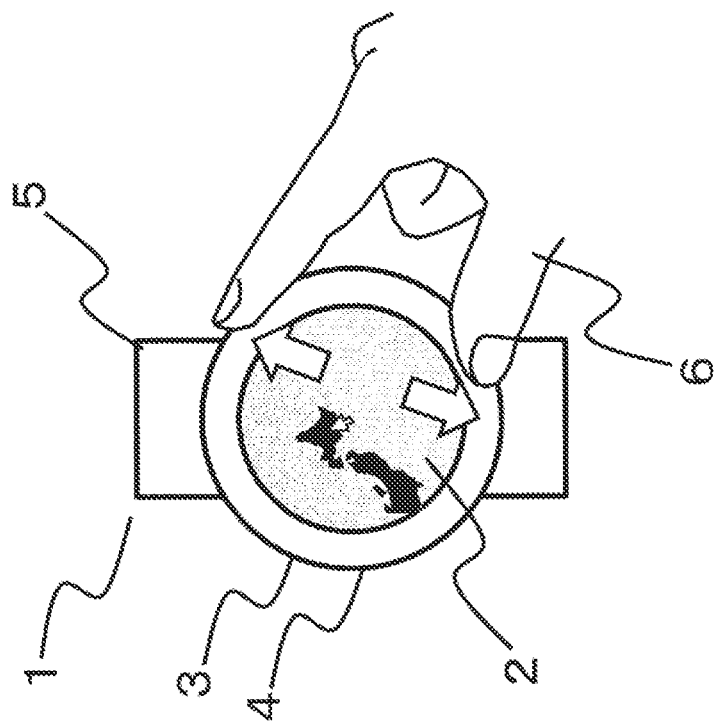

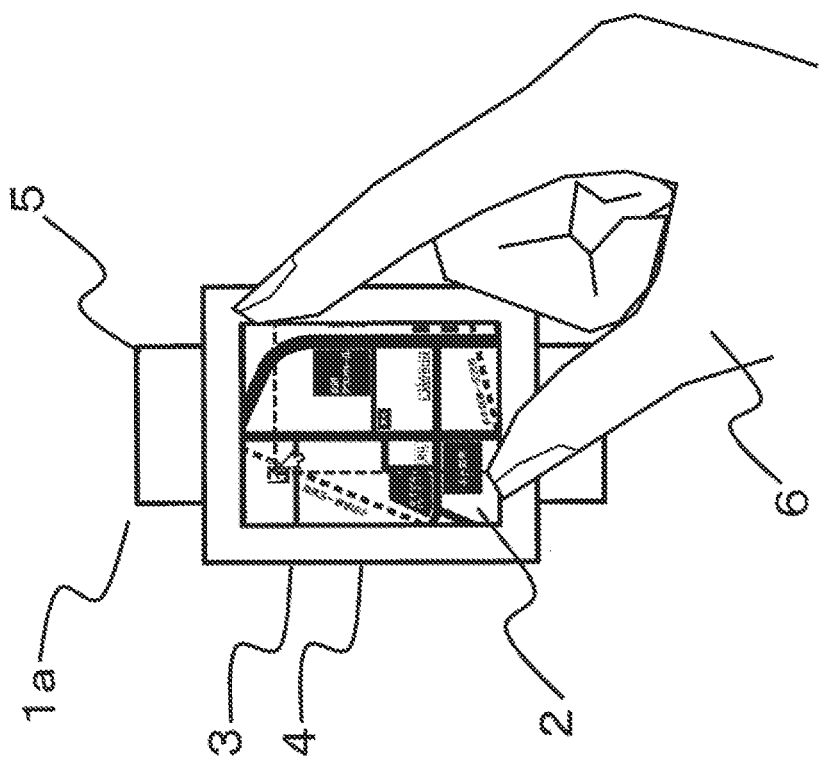
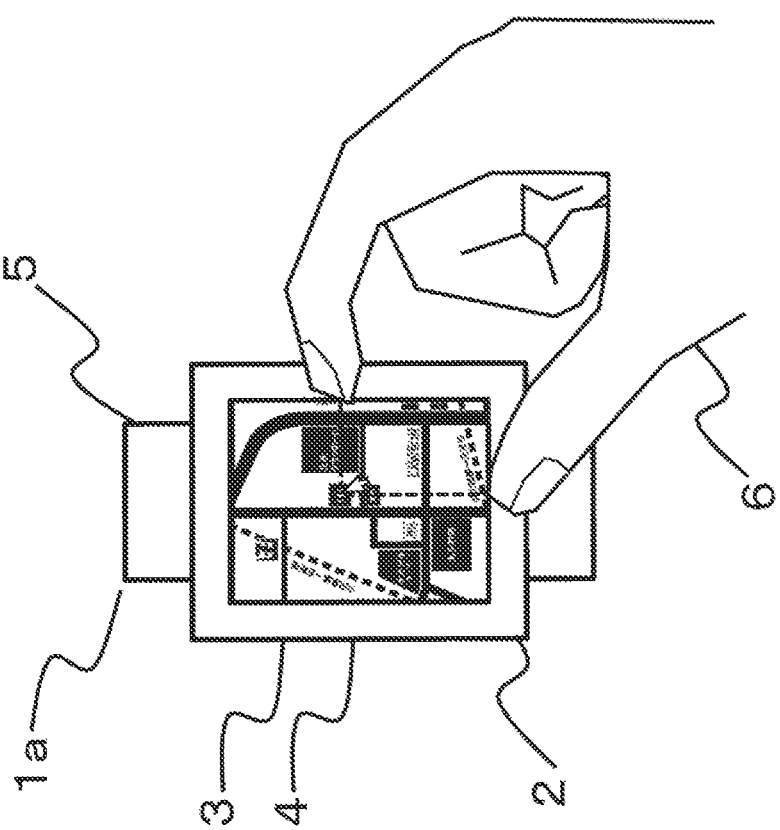

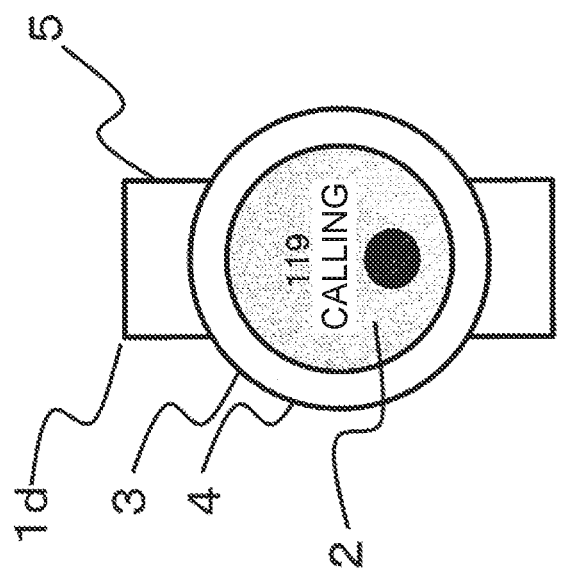
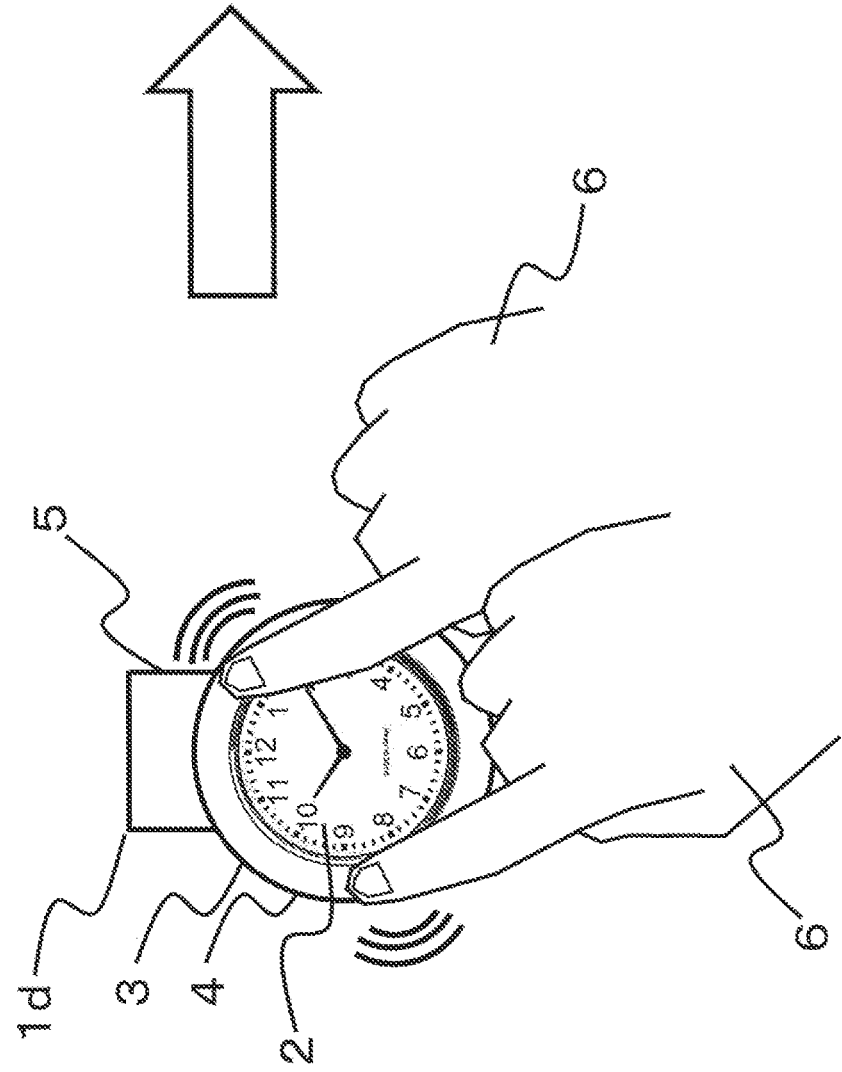
FIG.23

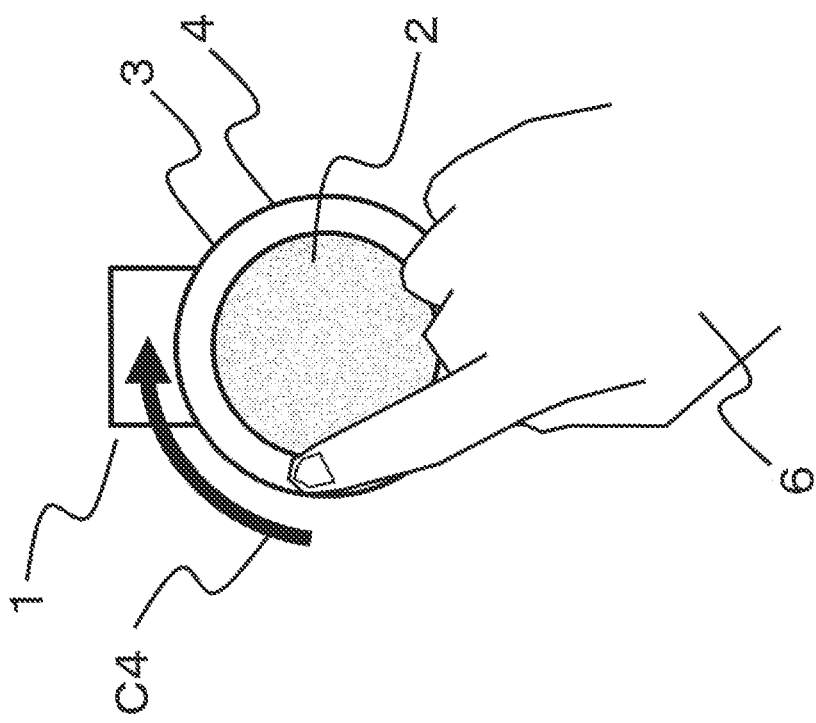
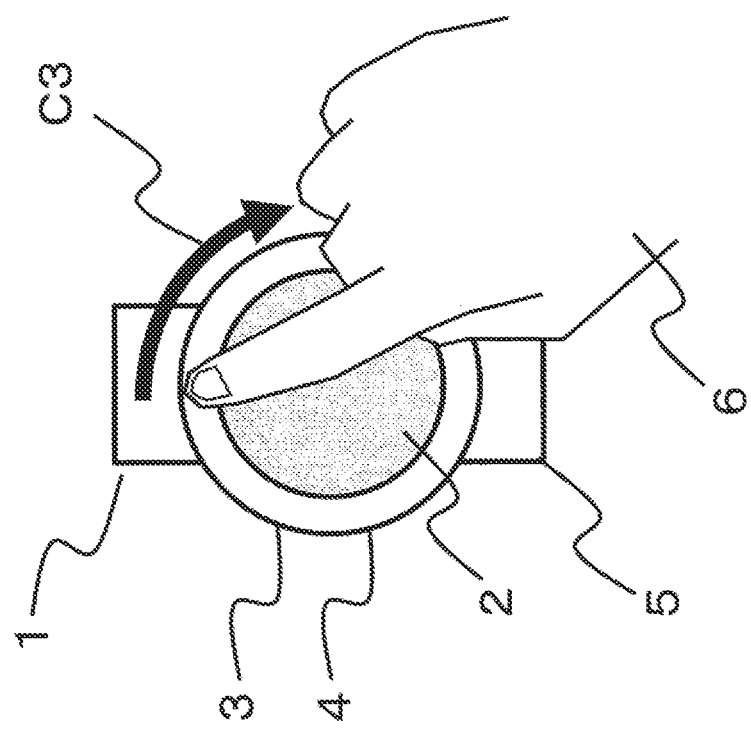

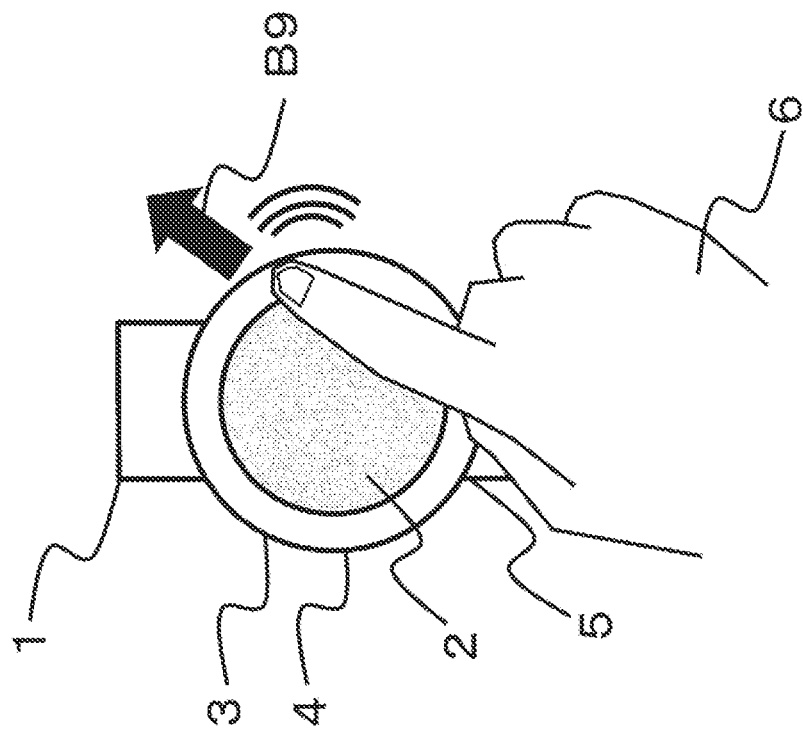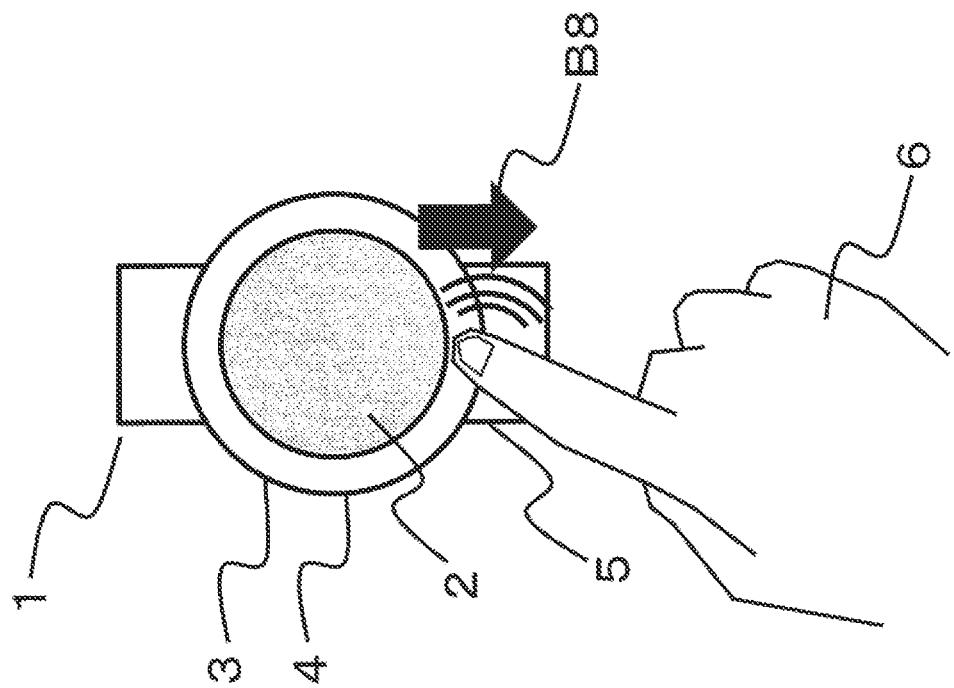

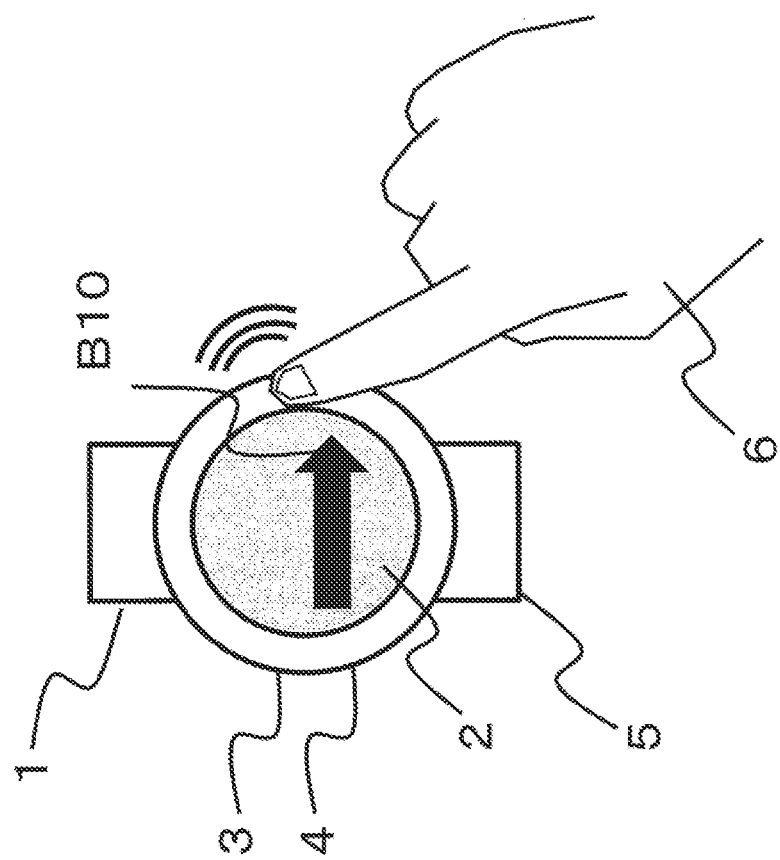

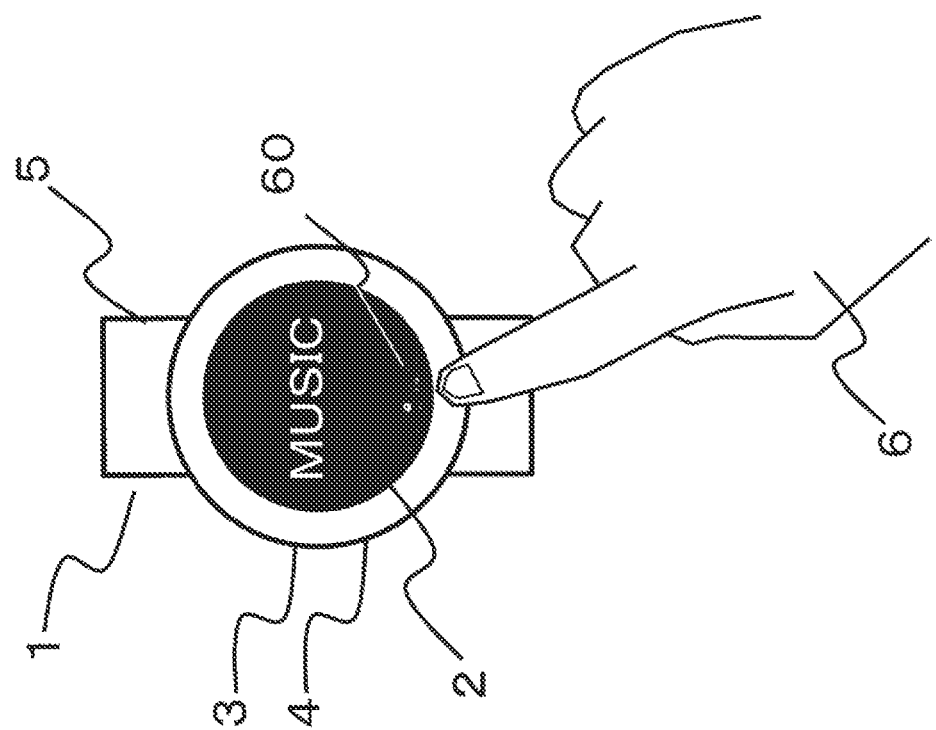

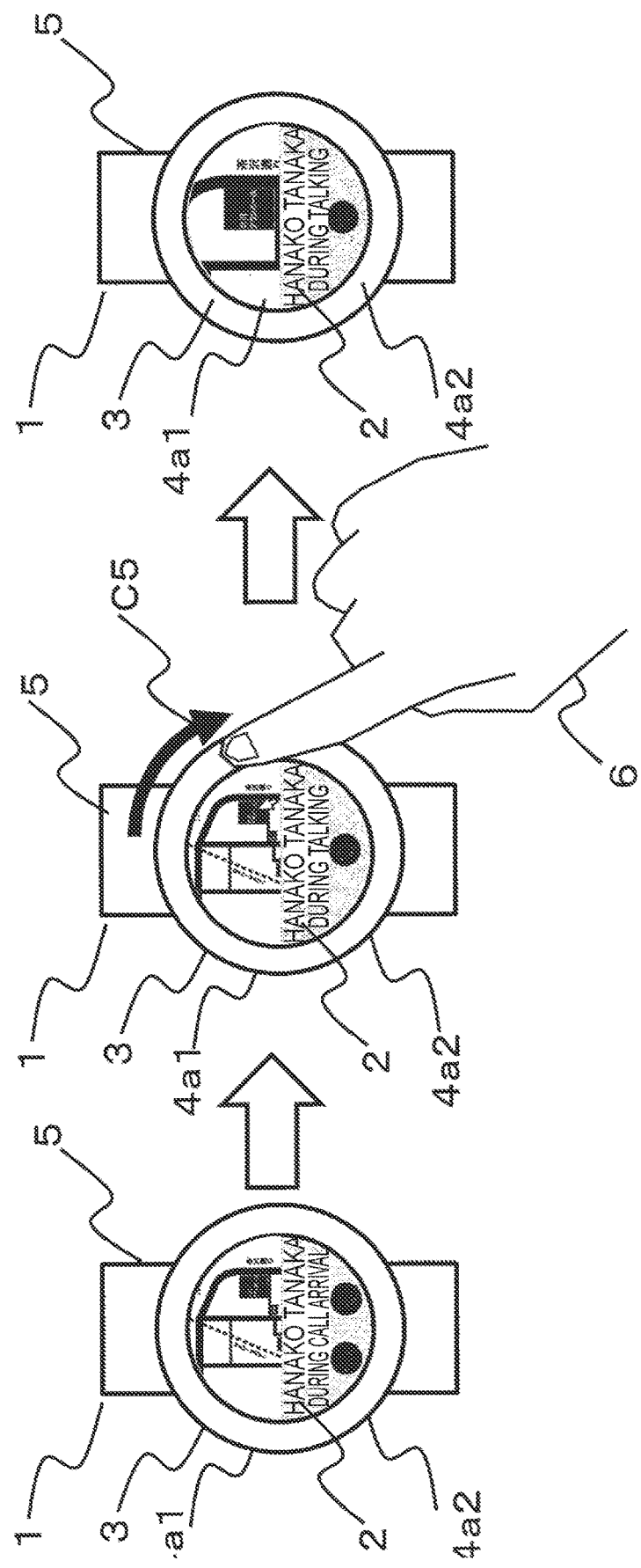

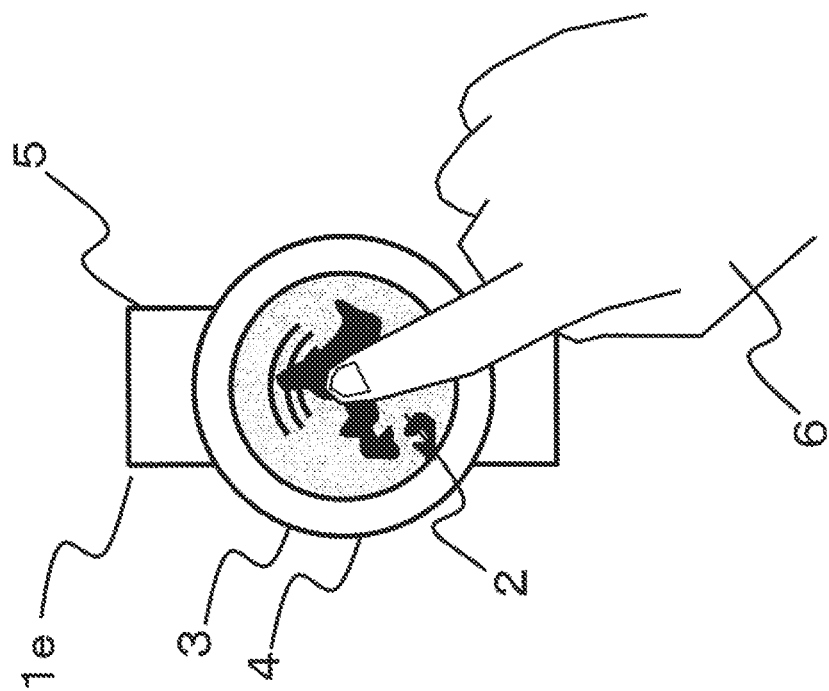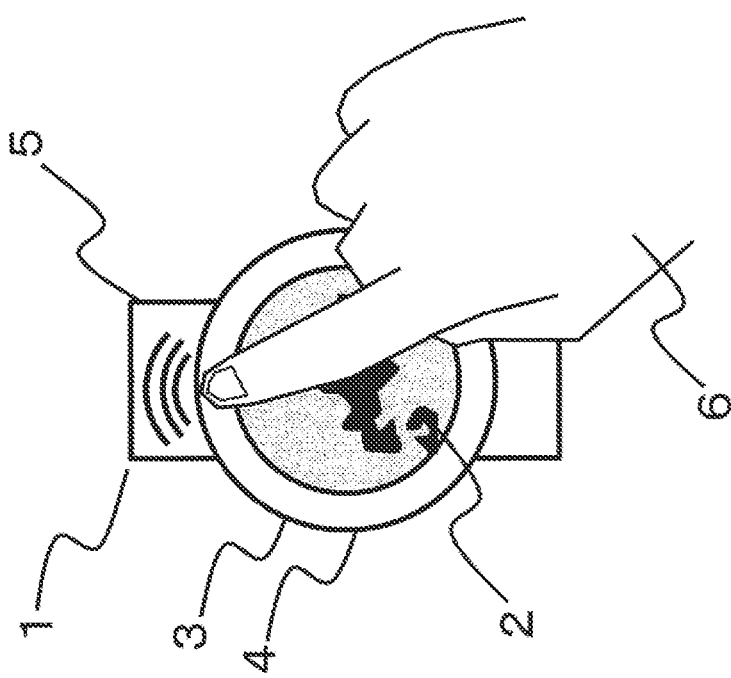

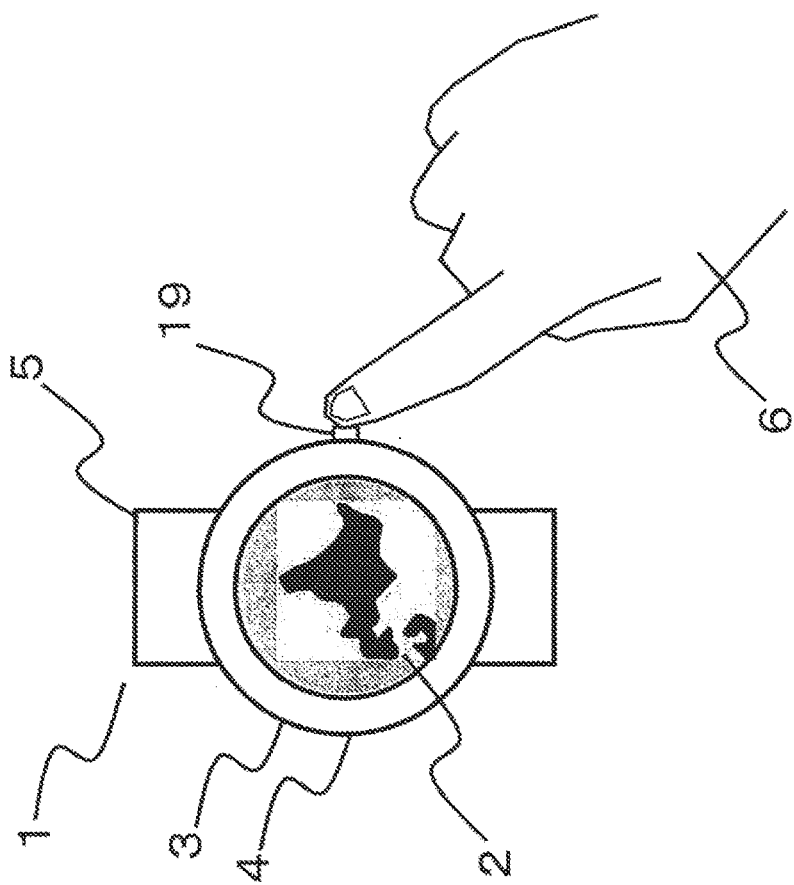
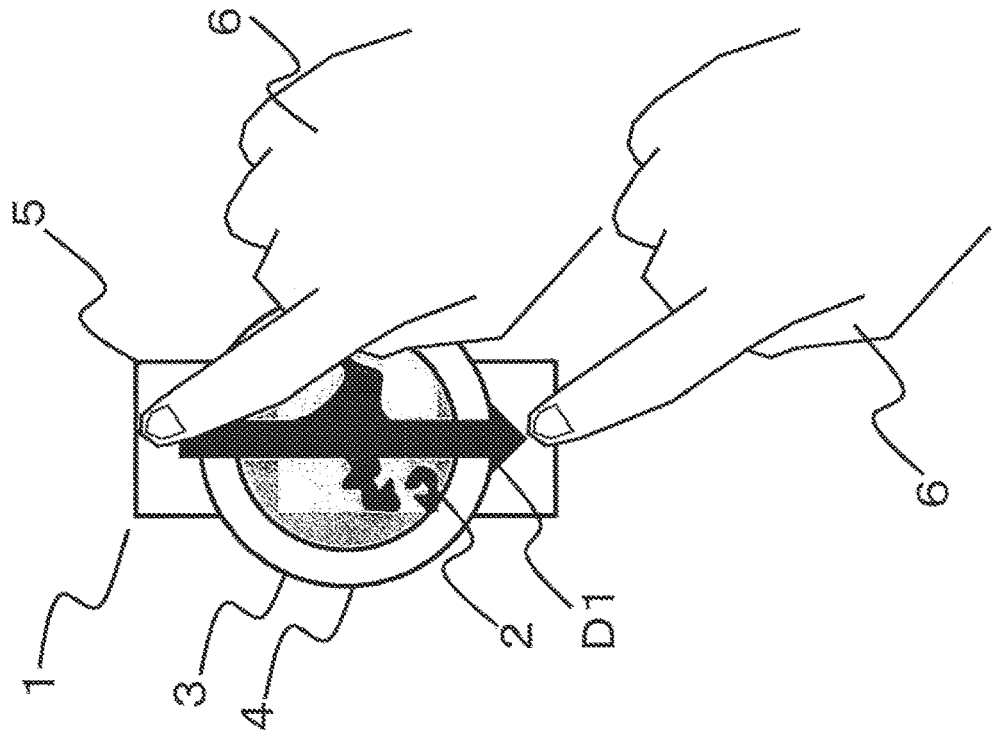
FIG.32A
FIG.32B

WEARABLE INFORMATION TERMINAL

TECHNICAL FIELD

The present invention relates to a wearable information terminal.

BACKGROUND ART

In recent years, portable wireless devices such as a wearable information terminal have become popular due to the user-friendliness that they can be used regardless of the time and location. In particular, with respect to the wearable information terminal, miniaturization is progressing because it is worn on the body and used. Similarly, majority of displays equipped on small terminals are small compared to those of smartphones and tablets. Many displays of the wearable information terminal adopt the touch panel, and selection and input operation are possible by touch operation of the fingertip, touch pen, and the like.

As an example of such wearable information terminal, in Patent Document 1, there is disclosed "a wrist watch type electronic note apparatus configured of: an infrared laser beam scanning means for detecting the direction and distance of fingertips during writing on the hand; a means for measuring the positions of the fingertips by receiving light reflected from the fingertips; a skin contact sound detection means which detects a handwriting state; a display means for note data; and a vibration generating means for properly responding to an operator" (excerption of the abstract).

Also, in Patent Document 2, there is disclosed "a wearable information terminal wearable around a user's arm having a display, a touch pad on the outside to the opposite position of the display when worn on the user's arm, a sensor detecting an inclination of the wearable information terminal against a reference axis, and a controller to show a pointer icon at a position corresponding to an operation position on the display when an operation to the touch pad is detected and to switch the display to an energy saving mode in a case where the inclination is within a predetermined range and the operation to the touch pad is undetected" (excerption of the abstract).

CITATION LIST

Patent Document

PATENT DOCUMENT 1: Japanese Patent No. 4899108
PATENT DOCUMENT 2: U.S. Unexamined Patent Application Publication No. 2015286246

SUMMARY OF INVENTION

Technical Problem

With respect to the display of the device disclosed in Patent Document 1, it is necessary to separately provide an optical system for detecting the direction and distance of the fingertips during handwriting on the surface of the back of the hand or the palm of the hand which is not user-friendly. Also, with respect to the wearable information terminal disclosed in Patent Document 2, because the touch pad is disposed at the opposite position of the display namely on the opposite side of the display across the wrist, it is hard to intuitively realize the input operation. From such circumstances, it is desired to contrive ways to improve operability of the wearable information terminal.

The present invention has been achieved in view of the circumstances described above, and its object is to provide a technology for improving operability of the wearable information terminal.

Solution to Problem

The object described above can be achieved by the configurations and the functions disclosed in the claims. The present invention includes plural means that solve the problem described above. An example of them is a wearable information terminal that can be worn by a user and is provided with: a main body unit; a display device that is incorporated in the main body unit and includes a screen; a control device that is incorporated in the main body unit and executes display processing onto the screen; and an operation detection unit that detects input operation performed by the user with respect to the control device. The operation detection unit is disposed at a different position in the main body unit from the position of the screen.

Advantageous Effect of Invention

According to the present invention, it is possible to provide a technology for improving operability of the wearable information terminal. Also, problems, configurations and effects other than those described above will be clarified by embodiments described below.

BRIEF DESCRIPTION OF DRAWINGS

FIG. 5 is a block diagram that shows a function configuration of a controller of the wearable information terminal.

FIG. 6 is a drawing that shows the correspondence relation between the contact detection unit disposed in the frame and the screen region.

FIG. 8 is a drawing that shows an example of operation information.

FIG. 14 is a drawing that shows an example in which the map screen is made to transit by frame operation, wherein (a) shows a standard size display example, and (b) shows an enlarged display example.

FIG. 15 is a drawing that shows an example in which the map screen is made to transit by frame operation, wherein (a) shows a pinch-in display example, and (b) shows a pinch-out display example.

FIG. 16 is a drawing that shows an operation example of a wearable information terminal having a quadrangular frame, wherein (a) shows a standard size display example, and (b) shows an enlarged display example.

FIG. 23 is a drawing that shows an operation example in a telephone application.

FIG. 25 is a drawing that shows another example of the frame operation (scroll of the screen), wherein (a) shows an example of touch start from a position equivalent to the vicinity of 12 o'clock of the frame, and (b) shows an example of touch start from a position equivalent to the vicinity of 9 o'clock of the frame.

FIG. 26 is a drawing that shows another example of the frame operation (scroll of the screen), wherein (a) shows an example of a scroll of the screen downward by a touch motion of the lower part of the frame, and (b) shows an example of a scroll of the screen to the upper right by a touch motion of the upper right part of the frame.

FIG. 27 is a drawing that shows another example of the frame operation (scroll of the screen).

FIG. 28 is a drawing that shows a frame operation example in a sound controller screen.

FIG. 29 is a drawing that shows a frame operation (screen separation) of a wearable information terminal.

FIG. 30 is a drawing that shows a return operation from a malfunction of a wearable information terminal, wherein (a) shows an example of double tapping the frame, and (b) shows an example of tapping the screen.

FIG. 32 is a drawing that shows a return operation from a malfunction of a wearable information terminal, wherein (a) shows an operation of tracing the screen along with the wearing section, and (b) shows an example of including a hard button for the return operation.

DESCRIPTION OF EMBODIMENT

Below, embodiments of the present invention will be explained in detail using the drawings. In explanations below, same configurations will be marked with a same reference sign, and duplicated explanation will be omitted.

Figure 1:
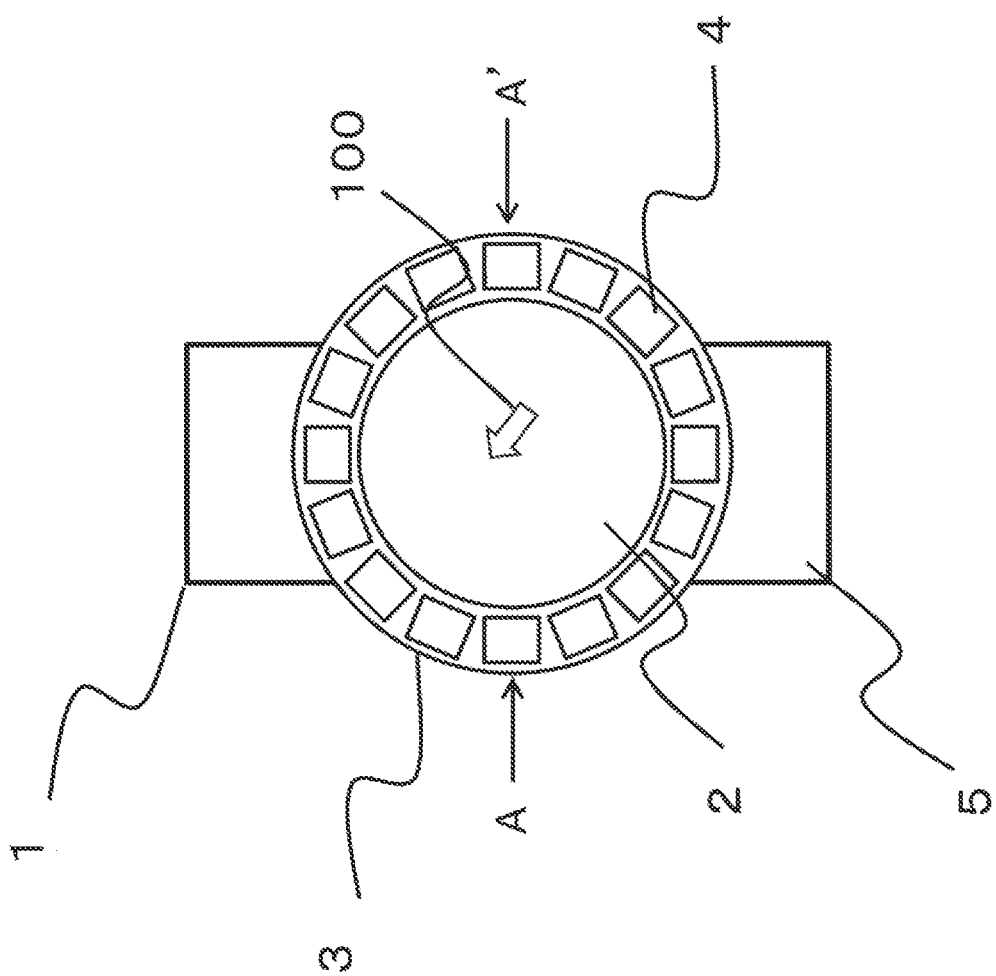
FIG. 1 is a schematic configuration drawing of a wearable information terminal related to the present embodiment.

A schematic configuration drawing of a wearable information terminal related to the present embodiment is shown in FIG. 1. The wearable information terminal 1 of FIG. 1 includes a screen 2 for displaying information, a frame 3 disposed so as to surround the screen 2, and a wearing section 5 for wearing the wearable information terminal 1 to the body, and contact detection units 4 are disposed in the frame 3 along the outer periphery of the screen 2. The contact detection units function as an operation detection unit because the contact detection units detect the operation of the user. Although it will be described below, another example of the operation detection unit may be a gyroscope sensor or a touch panel laminated on the screen.

Although 16 contact detection units 4 are disposed in the periphery of the screen 2 in FIG. 1, the amount of the contact detection units 4 is not limited to 16. Further, although a plurality of the contact detection units 4 is disposed along the outer periphery of the screen 2 in FIG. 1, when the shape of the contact detection units 4 can be integrally formed into the shape along the screen 2 the contact detection unit 4 may be configured as a single unit. Furthermore, although the contact detection units 4 are disposed so as to surround the outer periphery of the screen 2, it is not limited to the case of surrounding the outer periphery continuously, and the contact detection units 4 may be disposed in a discontinuous manner in a part on the outer periphery as shown in FIG. 1.

The contact detection unit 4 is configured of a touch sensor for example. It may be of either the resistance membrane type or the electrostatic capacitance type as far as it can detect contact of the finger or the hand of a human being, another part of the human body used for operation, a touch pen, and the like, and may be of other types also. Further, the contact detection unit 4 may be a pressure-sensitive sensor. The pressure-sensitive sensor can detect also the intensity of pressing-in in the thickness direction.

Also, with respect to the screen 2 and the frame 3, although a circular shape is shown in FIG. 1, it may be a polygonal shape including a triangular shape and a quadrangular shape. Because the wearable information terminal 1 has such configuration as described above, there is no event that the operating finger hides the display of the screen 2, and the user can operate it while confirming the contents of the screen 2.

Figure 2:
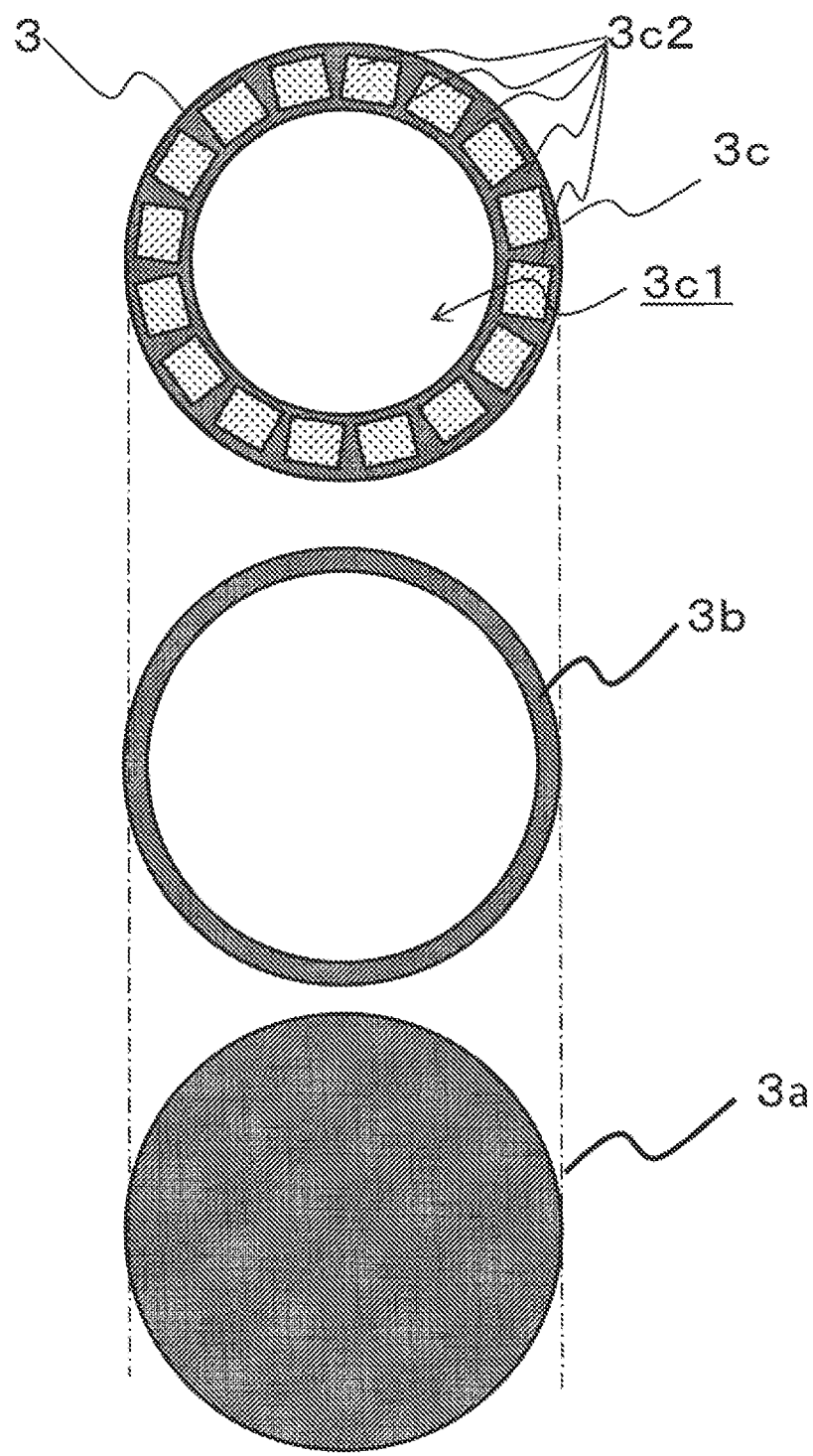
FIG. 2 is an exploded view of a frame (plan view).

FIG. 2 is an exploded view (plan view) of the frame 3. As shown in FIG. 2, the frame 3 includes a bottom surface 3a having a circular plate shape, a side surface 3b having an annular shape projecting along the peripheral part of the bottom surface 3a, and an upper surface 3c (equivalent to the frame section) attached to the upper part of the side surface 3b. The upper surface 3c includes an opening section 3c1 for fitting the screen 2 to its center. Also, in the periphery of the opening section 3c1 of the upper surface 3c, recessed sections 3c2 for fitting the contact detection units 4 are provided by plural numbers (16 pieces in FIG. 1). Respective contact detection units 4 of FIG. 1 are incorporated in respective recessed sections 3c2 of the upper surface 3c one by one.

Figure 3A:
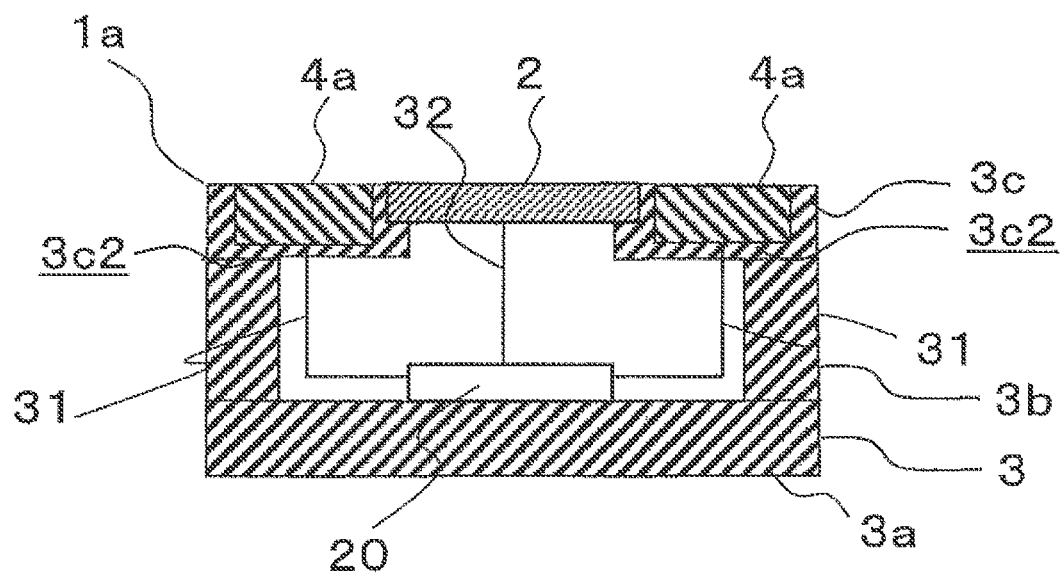
FIG. 3 is an A-A cross-sectional view in FIG. 1, wherein (a) shows an example in which contact detection units are provided on the upper surface of the frame, and (b) shows an example in which a contact detection unit is provided on the bottom surface of the frame in addition to (a).
Figure 3B:
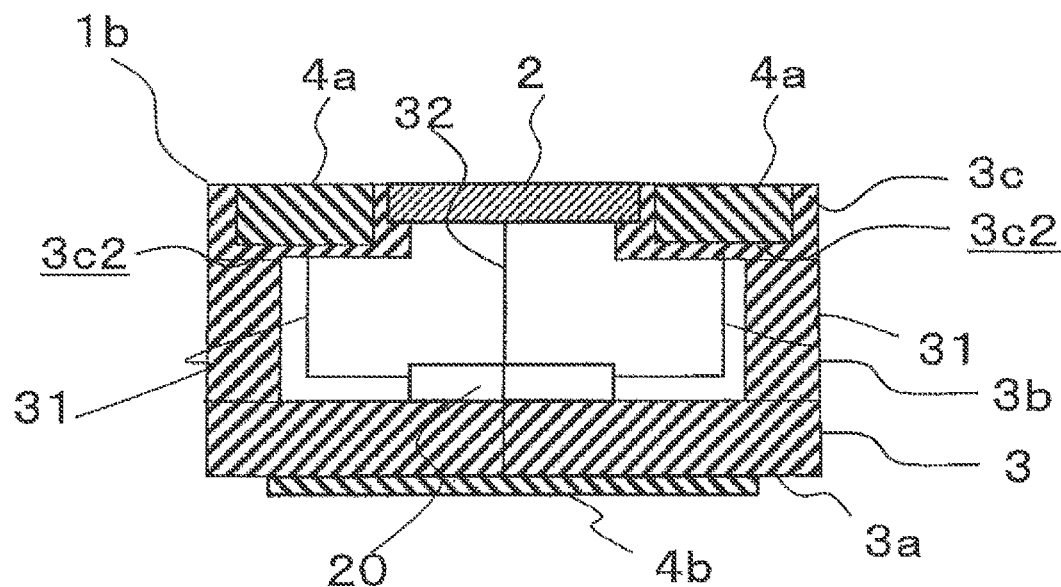

FIG. 3 is an A-A cross-sectional view in FIG. 1, wherein (a) shows an example in which contact detection units 4a are provided on the upper surface 3c of the frame, and (b) shows an example in which a contact detection unit 4b is provided on the bottom surface 3a of the frame in addition to (a). As shown in FIGS. 3 (a) and (b), a controller 20 of a wearable information terminal 1a is incorporated within a space surrounded by the bottom surface 3a, side surface 3b, and upper surface 3c of the frame 3. Also, the contact detection unit 4a is incorporated in each recessed section 3c2 of the upper surface 3c, and each contact detection unit 4a is electrically connected to the controller 20 through a bus 31. Further, the screen 2 is also electrically connected to the controller 20 through a bus 32.

Also, in addition to the configuration of the wearable information terminal 1a, the wearable information terminal 1b shown in FIG. 3 (b) includes the pressure-sensitive sensor 4b as an additional contact detection unit 4 on the bottom surface 3a of the frame 3 namely on the surface facing the wearing portion of the wearer of the bottom surface 3a of the frame 3. The pressure-sensitive sensor 4b is also electrically connected to the controller 20 through a bus 33. Because other configurations are the same as those of the wearable information terminal 1 of FIG. 1, the wearable information terminal 1a and the wearable information terminal 1b are same to each other in a plan view.

Figure 4:
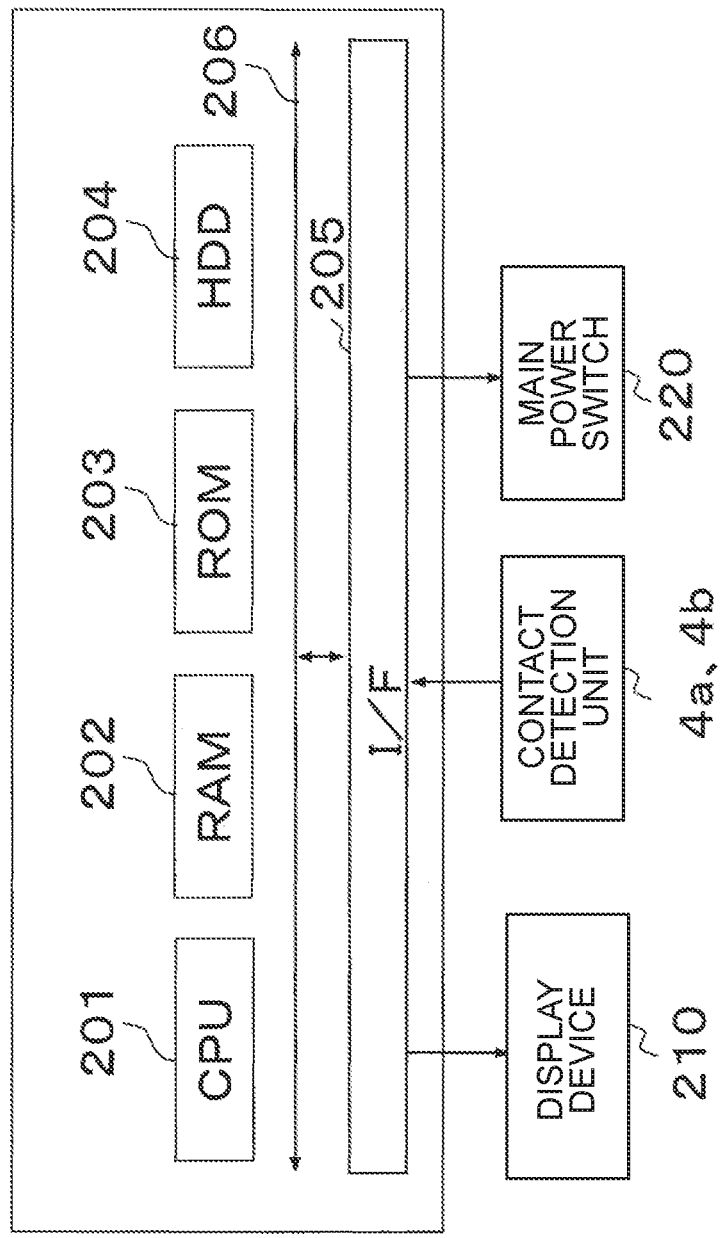
FIG. 4 is a block diagram that shows a hardware configuration of the wearable information terminal.

FIG. 4 is a block diagram that shows a hardware configuration of the wearable information terminal 1. The wearable information terminal 1 is configured by connecting a display device 210 including the screen 2, the contact detection units 4a, 4b, and a main power switch 220 to the controller 20. The controller 20 includes a CPU 201 as a control/calculation device, a RAM 202 as a volatile storage device, a ROM 203 as a non-volatile storage device, an HDD 204 (may possibly be an SSD), and an interface (I/F) 205, and each of these configuration elements is connected to each other through a bus 206. The display device 210, contact detection units 4a, 4b, and main power switch 220 are connected to the I/F 205.

FIG. 5 is a block diagram that shows a function configuration of the controller 20 of the wearable information terminal 1. The controller 20 includes an application control unit 21, an operation conversion unit 22, a display control unit 23, an operation information storage unit 24, and a screen management information storage unit 25. The application control unit 21, operation conversion unit 22, and display control unit 23 may be configured by that the CPU 201 loads software such as the OS and application stored in the ROM 203 and the HDD 204 to the RAM 202 and executes the software. Also, the application control unit 21, operation conversion unit 22, and display control unit 23 may be also configured by an integrated circuit achieving the functions of them. The operation information storage unit 24 stores operation information that specifies the kind of operation detected by the contact detection units 4a, 4b for each kind of the software stored in the wearable information terminal 1 and the operation contents corresponding to them (will be described using FIG. 8). The screen management information storage unit 25 stores the last screen information displayed on the display device 210 and the screen separation information which will be described below. The operation information storage unit 24 and the screen management information storage unit 25 are configured of the storage devices such as the RAM 202, ROM 203, or HDD 204.

FIG. 6 is a drawing that shows the correspondence relation between the contact detection unit disposed in the frame and the screen region. As shown in FIG. 6, the screen 2 includes the contact detection unit of the same number of pieces with that of the contact detection units 4 namely 16 pieces of the contact detection units 401 to 416 in the example of FIG. 6 by radial lines (shown by single-dot chain lines) passing the screen center point, and the screen 2 is separated into 16. One contact detection unit is disposed between adjacent radial lines. Also, information (screen separation information) in which a separated screen 211 for example of the screen 2 surrounded by the radial lines and a contact detection unit 401 that exists at the outer peripheral part of the separated screen 211 are made to correspond to each other is stored in the screen management information storage unit 25.

Further, when the finger of the user touches the contact detection unit 401, a signal (input signal) of detecting the touch is outputted from the contact detection unit 401 to the controller 20, and the operation conversion unit 22 refers to the screen separation information, generates an operation signal for displaying a pointer (also called a cursor) 100 at the initial set position of the separated screen 211 that is made to correspond to the contact detection unit 401, and outputs the operation signal to the display control unit 23. Further, when the touch position of the finger at the contact detection unit 401 transits to an optional two-dimensional direction of up, down, left, and right, the position of the pointer icon 100 transits according to the change amount of the touch position.

Although such example was shown in FIG. 6 that the contact detection units 4 were provided by 16 pieces and the screen was separated into 16, the number of pieces of the contact detection units 4 and the screen separation number are not limited to 16. Further, although the contact detection unit and the separated screen corresponding to it were made to correspond to each other by 1 to 1 in the above description, it is also possible to make plural contact detection units correspond to one separated screen.

Also, out of applications executed in the wearable information terminal 1, in an application suitable when there is provided a function of designating a specific coordinate of the screen, although it is possible to store the screen separation information in the controller 20 beforehand, to read the screen separation information when the application is activated, and to execute the corresponding process for the contact detection unit 4 and the separated screen, when only such application is executed in the wearable information terminal 1 that the function of designating a specific coordinate of the screen is not required, it is not necessary to provide the screen separation information. In this case, it may be configured that, whichever of the contact detection unit may be touched, the pointer is displayed at a predetermined initial set position within the screen, and the pointer position transits according to the deviation amount of the touch position. Further, it is also possible to be configured that, even when the screen separation information is not stored at the initial state namely the shipping state for example of the wearable information terminal 1, the screen separation information is installed in installing such application to the wearable information terminal 1 that is suitable when there is provided a function of designating a specific coordinate of the screen (including a case of installing such application by downloading the same from the network).

Figure 7A:
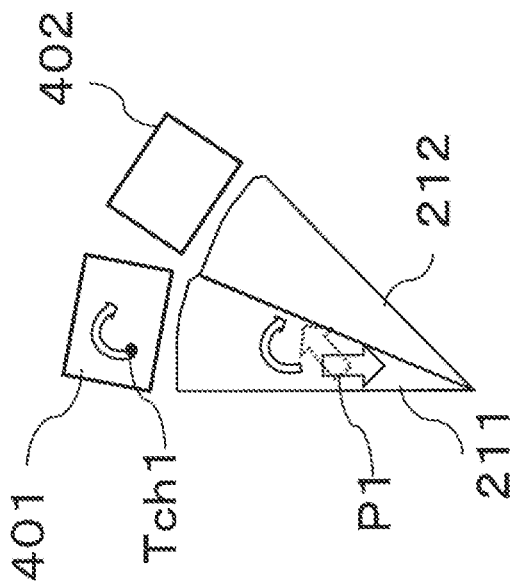
FIG. 7 is a partial enlarged view of FIG. 6, wherein (a) shows a swipe motion, and (b) shows transition of the pointer in a turning touch.
Figure 7B:
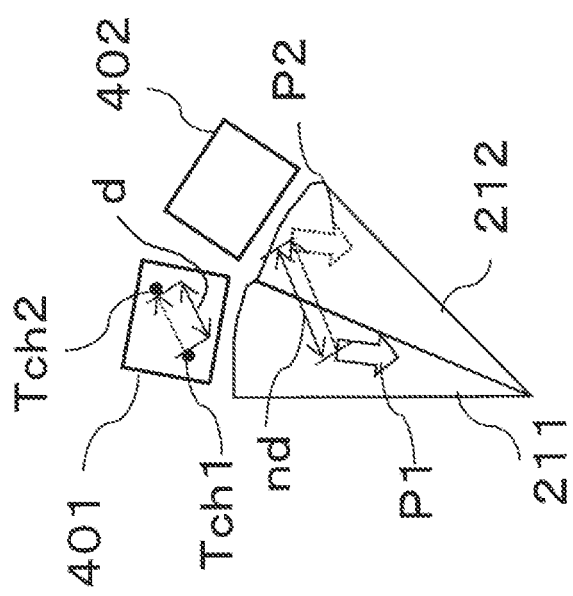

FIG. 7 is a partial enlarged view of FIG. 6, wherein (a) shows a swipe motion, and (b) shows transition of the pointer in a turning touch. As shown in FIG. 7 (a), when the user touches an optional point Tch1 within the contact detection unit 401, the pointer is displayed at an initial set point P1 of the separated screen 211 that is made to correspond to the contact detection unit 401. In this state, the user gives a swipe to a point Tch2 of the contact detection unit 401. When the distance from Tch1 to Tch2 is d, the display position of the pointer transits to a position P2 that is shifted by the distance nd (n>0) in the same direction of the swipe movement. Although the position P2 is within a separated screen 212 in the example of FIG. 7 (a), there is also a case that P2 is fitted into the separated screen 211 according to the set value of n or the value of the distance d.

Also, when the optional point Tch1 of the contact detection unit 401 is turned in the touched state as shown in FIG. 7 (*b*), the pointer rotates at the initial set position P1.

FIG. 8 is a drawing that shows an example of operation information. Operation screen transit correspondence information is information specifying the correspondence relation of the kind of the application, the kind of the touch motion when the application is running, and the content of the screen transit by the touch motion. For example, even when the touch motion is a motion of "tracing the frame", when the desktop screen has been displayed, the pointer icon is movingly displayed. However, when the mail application is running, if the motion of "tracing the frame" is executed, the screen scrolls. Thus, even in a similar motion, the screen transit content changes according to the running application, and therefore these correspondence relations are specified in the operation screen transit correspondence information.

Figure 9:
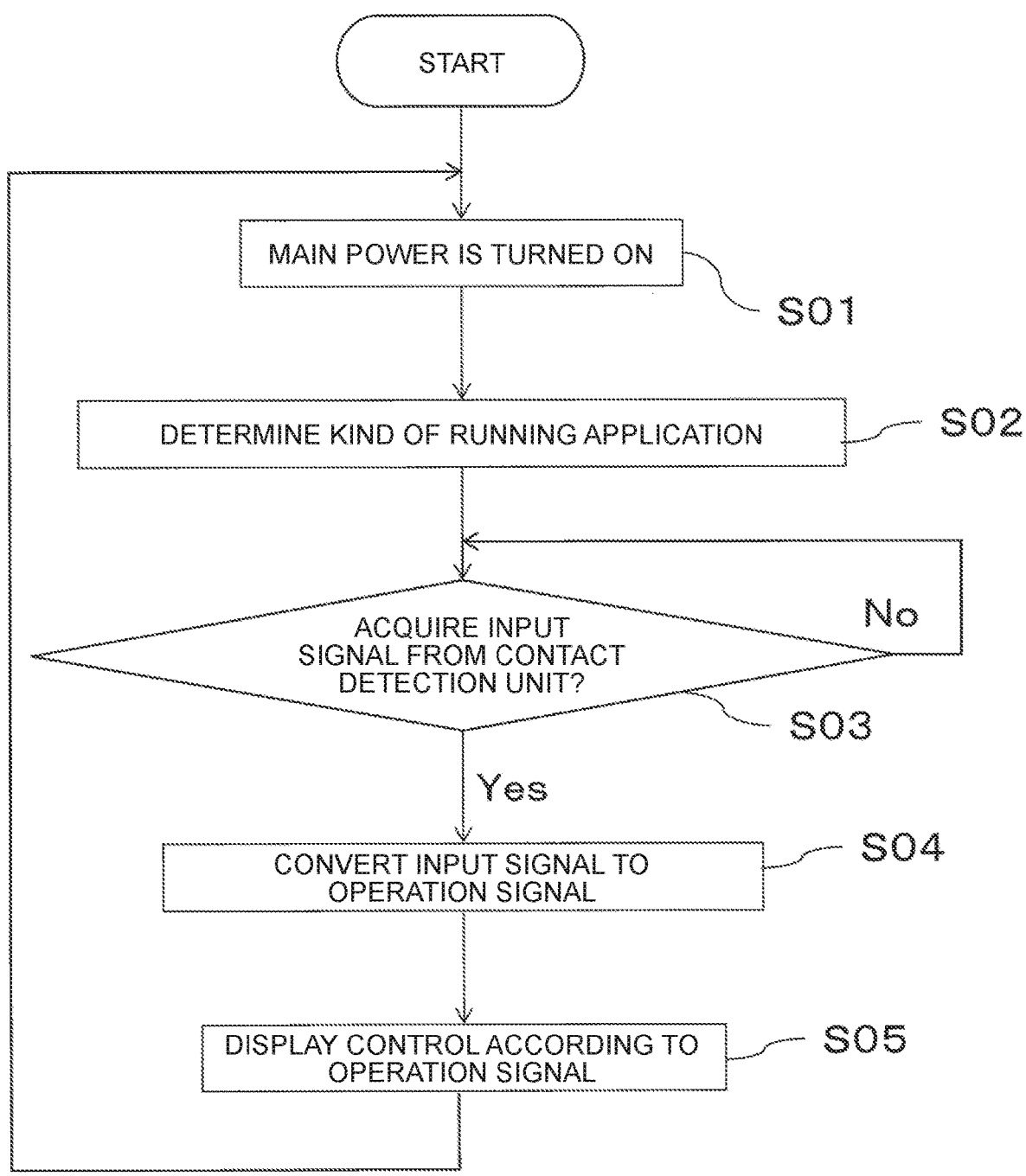
FIG. 9 is a flowchart that shows a process flow of a wearable information terminal.

FIG. 9 is a flowchart that shows a process flow of the wearable information terminal 1. When the main power switch 220 is pressed, a power supply signal is outputted to the controller 20. When the power is supplied (S01), the application control unit 21 determines the kind of the running application (S02), and extracts operation information from the operation information storage unit 24, the operation information corresponding to the kind of the running application. The running application mentioned here also includes desktop screen display software (may be configured as a function of OS) of a case where a specific application has not been activated and the desktop screen has been displayed.

The operation conversion unit 22 holds the frame operation (S03/No), and the contact detection unit 401 outputs a signal (input signal) showing that the contact has been detected to the controller 20. When the operation conversion unit 22 acquires the signal (S03/Yes), the operation conversion unit 22 refers to the operation information extracted in S01 and converts the input signal to an operation signal (S04). When the input signal is converted to the operation signal showing the activation command of the application, an application activation signal is outputted from the operation conversion unit 22 to the application control unit 21. In the screen separation process described below, screen separation information in which the separation number and the separation position of the screen and the contact detection unit corresponding to them are rerated is stored beforehand in the screen management information storage unit 25, and the operation conversion unit 22 refers to the screen separation information and converts the input signal to an operation signal with respect to the separated screen.

The input signal is a signal that shows the position of the contact detection unit 4 that has been touched. The operation conversion unit 22 determines the motion of touching the frame as "motion of tracing the frame", "motion of tracing the frame in the width direction", "two points (two axes) simultaneous touch of pinch-in/pinch-out and the frame", "touching the frame section in question in the intended scroll direction", "frame touch position+touch motion", or "double tapping" (refer to FIG. 8) based on the time series change of the input signal, converts the input signal to the operation signal, and outputs the operation signal to the display control unit 23.

The display control unit 23 outputs a display control signal for executing display in accordance with the operation signal to the display device 210 including the screen 2, and executes the display control (S05). In a case of a return motion from a malfunction described below, the display control unit 23 reads the last screen information from the screen management information storage unit 25, and outputs a display control signal that displays the last screen shown by the last screen information to the display device 210. The processes from S02 to S05 are repeated until the main power of the wearable information terminal 1 is turned OFF.

Below, operation examples of each application specified in the operation information of FIG. 8 will be explained.

(Desktop Screen 1)

Figure 10:
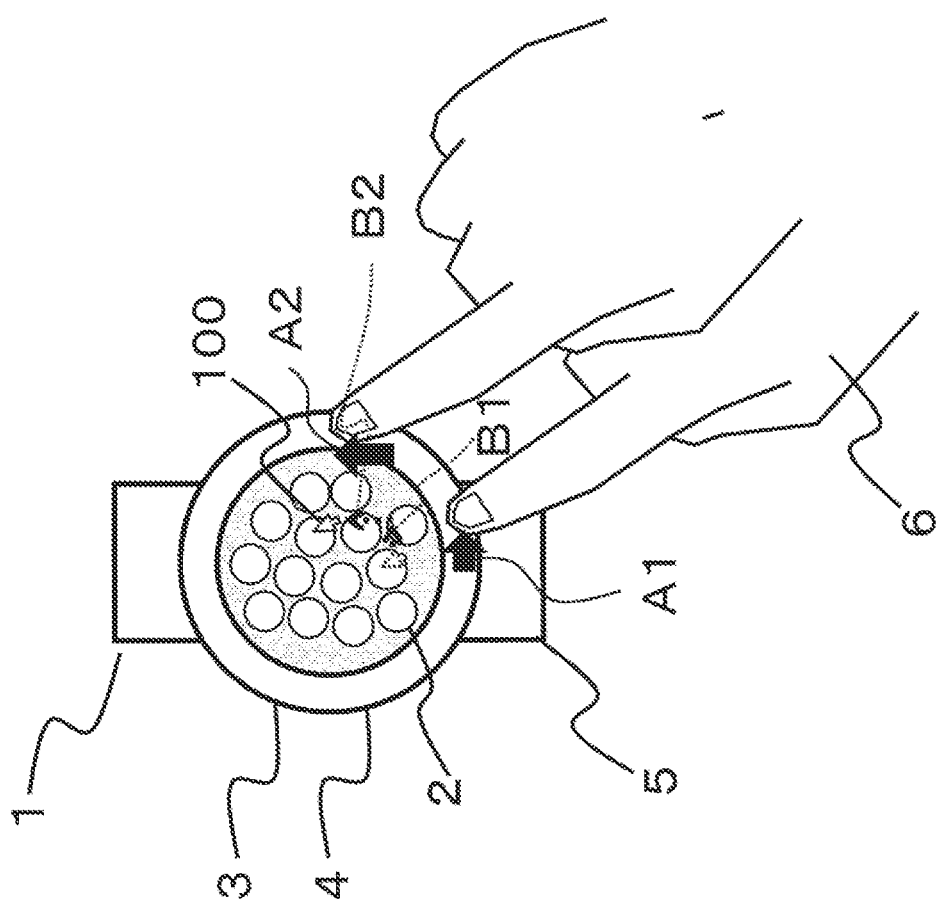
FIG. 10 is a drawing that shows an example in which the desktop screen is made to transit by frame operation.

FIG. 10 is a drawing that shows an example in which the desktop screen is altered by frame operation. In FIG. 10, plural icons are displayed on the screen 2. Because the icons displayed on the small screen 2 are smaller compared to the operating finger, it is hard to precisely touch the target icon by the finger out of plural icons, and a malfunction may possibly occur. Also, because the target icon is hidden by the operating fingertip, the user himself/herself hardly realizes the relative positional relation between the own fingertip at the time of the touch and the target icon. Therefore, in FIG. 10, the pointer icon 100 is displayed first on the screen 2. The user can optionally designate the display method of the pointer icon 100. For example, it may be an operation of touching, holding down, tapping, and the like of the screen 2, and may be operation for the frame 3.

Also, the pointer icon 100 has a role of clarifying the selected position in the screen 2 for the user on a real-time basis. Here, with respect to the shape and color of the pointer icon 100, the detail is no object as far as the present selected position can be known clearly.

The pointer icon 100 can be operated by that the user touches the frame 3. For example, as shown in FIG. 10, the pointer icon 100 can be moved to the left and right (arrow B1) by tracing the frame 3 in the lateral direction (arrow A1), and the pointer icon 100 can be moved vertically (arrow B2) by tracing the frame 3 in the vertical direction (arrow A2). The wearable information terminal 1 detects that it has been operated by a hand 6 of the user by the contact detection unit 4 disposed in the frame 3, and moves the pointer icon 100. Thereby, the pointer icon 100 moves from the position before moving (displayed by the pointer icon shown by the dotted line) to the position of the pointer icon 100.

Thus, according to the example of FIG. 10, the selection operation can be executed while confirming the display content of the small screen 2, and the malfunction can be reduced compared to the case of selection by direct touch of the screen 2 with the finger.

(Desktop Screen 2)

Figure 11:
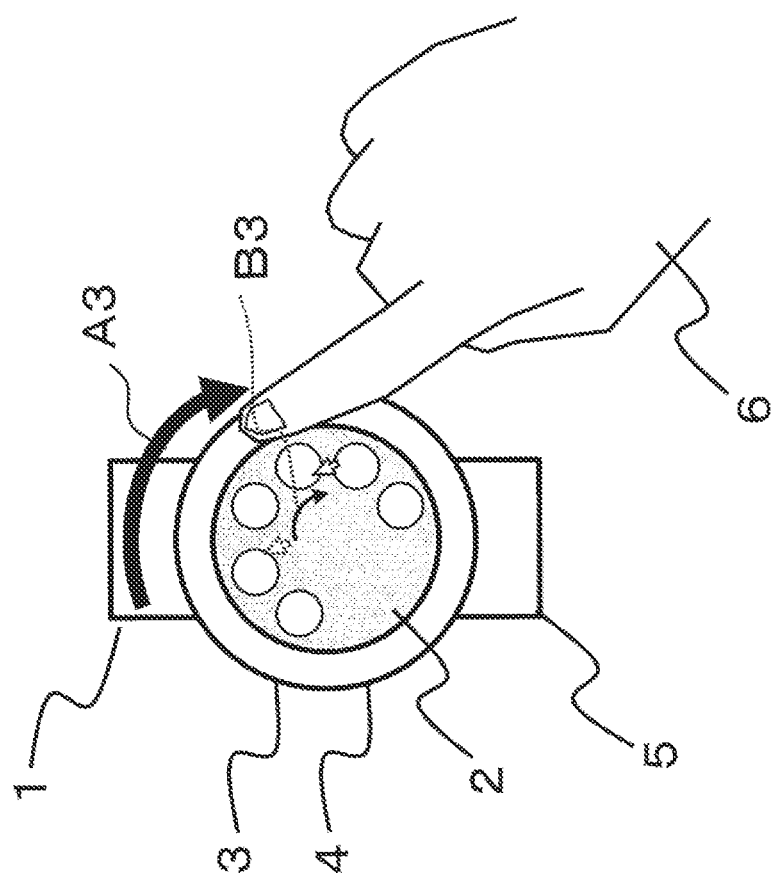
FIG. 11 is a drawing that shows another example in which the desktop screen is made to transit by frame operation.

FIG. 11 is a drawing that shows another example in which the desktop screen is made to transit by frame operation. In the desktop screen of FIG. 11, icons of the applications are displayed on the screen 2 along the peripheral direction of the frame 3. In this case, the pointer icon 100 moves along the frame 3 (arrow B3) by that the user traces the frame 3 (arrow A3). Also, in this example, the pointer icon 100 may be displayed, but display of the pointer icon 100 is not indispensable. For example, in a case where the pointer icon 100 has not been displayed, such display of allowing the user to clearly know the present selected position is made such as an enlarged display of the selected icon.

(Browser)

Figure 12:
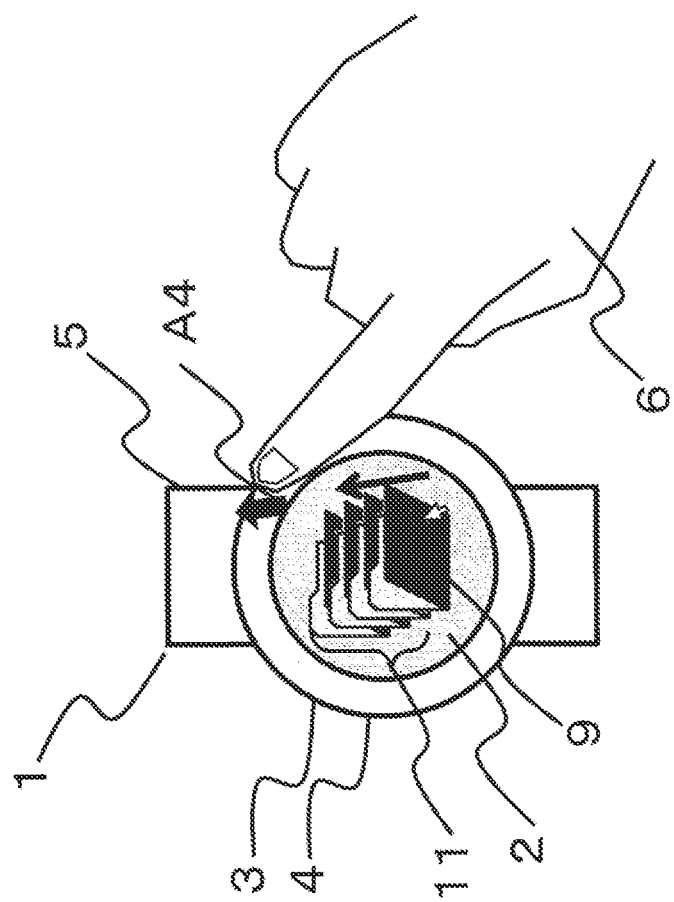
FIG. 12 is a drawing that shows an example in which the browser screen is made to transit by frame operation.

FIG. 12 is a drawing that shows an example in which the browser screen is made to transit by frame operation. In the browser screen of FIG. 12, plural folders are overlappingly displayed, and it is assumed that a folder 9 has been selected at present by the pointer icon 100. When the user intends to select another folder 11 in this state, the user changes the folder to be selected by tracing the frame 3 in the width direction (arrow A4) for example. Although the folders overlappingly displayed were exemplified here, such web pages and the like are also possible for example that plural web pages are activated and are overlappingly displayed. According to the example of FIG. 12, the selection operation can be executed while confirming the display contents of the small screen 2, and the malfunction can be reduced compared to the selection by direct touch of the screen 2 with the finger.

(Map Application)

Figure 13:
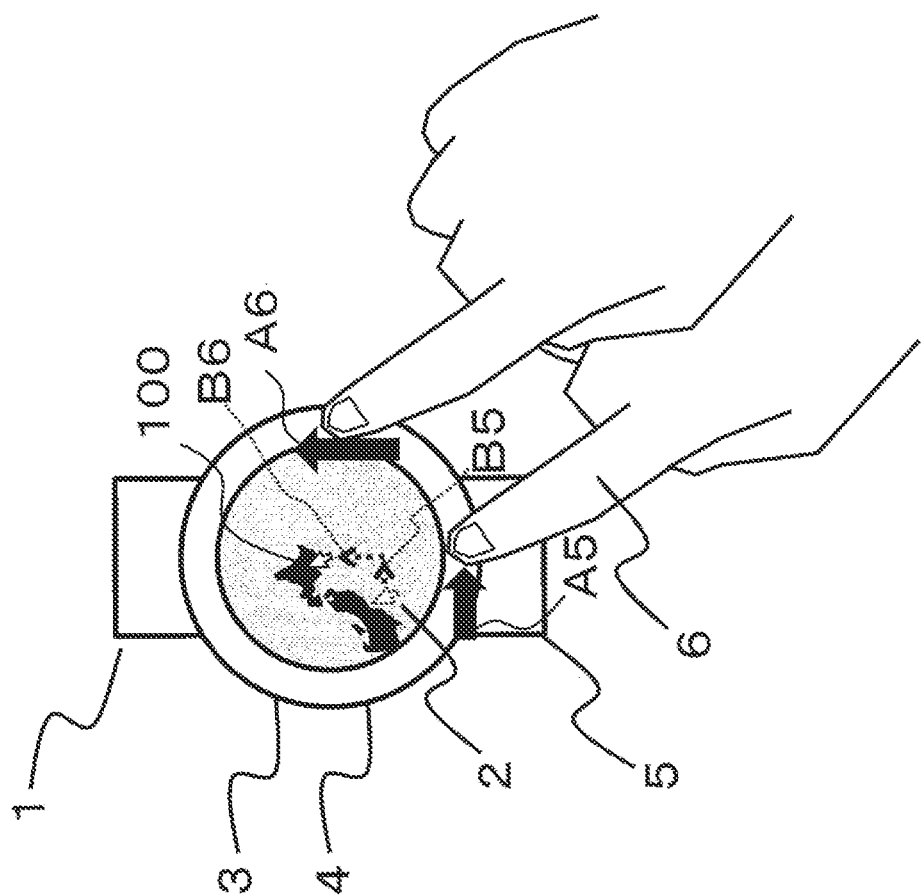
FIG. 13 is a drawing that shows an example in which the map screen is made to transit by frame operation.

FIG. 13 to FIG. 15 are drawings that show examples in which the map screen is made to transit by frame operation. As shown in FIG. 13, for example, when it is intended to browse a map by the small screen 2, the pointer icon 100 is used for selecting a specific position of the displayed content. Similarly to the example described above, the pointer icon 100 moves to the lateral direction (arrow B5) or the vertical direction (arrow B6) of the screen 2 by tracing the frame 3 in the lateral direction (arrow A5) or the vertical direction (arrow A6).

For example, by tracing the frame 3 clockwise as illustrated by the arrow C1 of FIG. 14 after selecting a specific position (a position where the pointer icon 100 is displayed in FIG. 13 is equivalent to the specific position), the display transits from the initial display size (refer to FIG. 14 (a)) to the enlarged display (refer to FIG. 14 (b)).

Further, it is also possible to allocate a different function according to a tracing method such as contraction by counterclockwise tracing, and so on.

Furthermore, as shown in FIG. 15, contraction or expansion may be also executed by pinch-in (refer to FIG. 15 (a)) or pinch-out (refer to FIG. 15 (b)) of the frame 3.

When the screen 2 was directly touched or swiped and so on by the fingertip and the operation including contraction or expansion and the like of the screen was executed as done in the past, there was a problem that the screen 2 was hidden by the operating fingertip and, when information incapable of being fitted into one screen such as a map was to be scrolled for example, it was hard to know the part and direction to which scroll was performed. However, according to the present example, operation of contraction, expansion and the like of the selected position is possible while confirming the map displayed on the small screen 2, there is an effect that the operation contents are quite obvious for the operating user himself/herself, and the malfunction can be reduced. As an associated effect, there is also an advantage that a stain such as a fingerprint is hardly attached onto the liquid crystal screen.

(Quadrangular Frame)

FIG. 16 is a drawing that shows an operation example of a wearable information terminal having a quadrangular frame, wherein (a) shows a standard size display example, and (b) shows an enlarged display example. The vertical axis and horizontal axis of the frame 3 are deemed to be the y-axis and the x-axis respectively, and the xy-coordinate is designated. Thereby, a specific position can be selected easily. For example, when it is intended to select a specific position at the time of browsing a map, if a position is touched by the fingertip, the target position is hidden because the screen 2 is small. Therefore, as shown in FIG. 16, utilizing the frame 3 of the wearable information terminal 1a, the vertical axis and the horizontal axis are touched simultaneously by two fingers. By selecting one point determined with the coordinate of the vertical axis touched as the y-coordinate and with the coordinate of the horizontal axis touched as the x-coordinate, even when the small screen 2 is not touched directly, a position of the designated coordinate can be selected.

Figure 17:
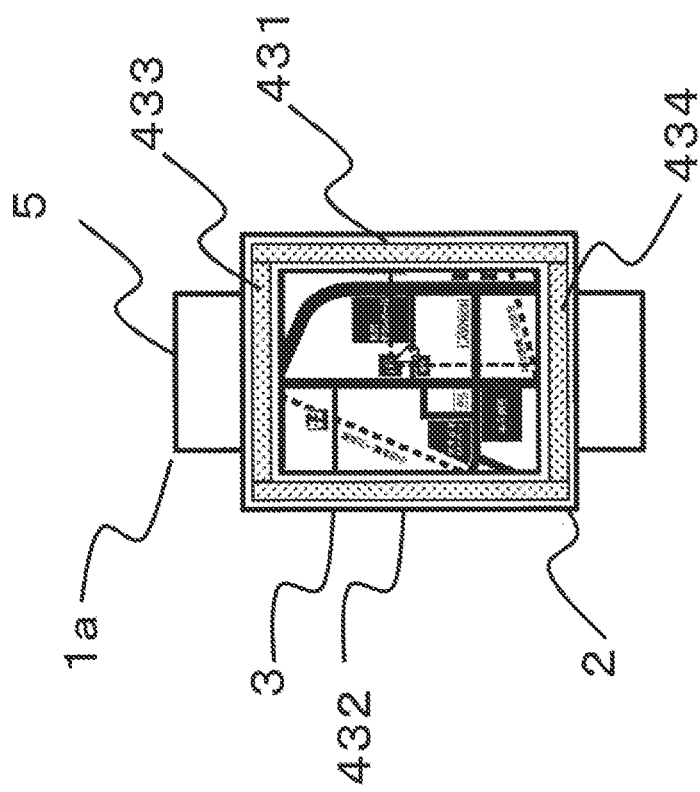
FIG. 17 is a schematic configuration drawing of the wearable information terminal shown in FIG. 16.
Figure 18:
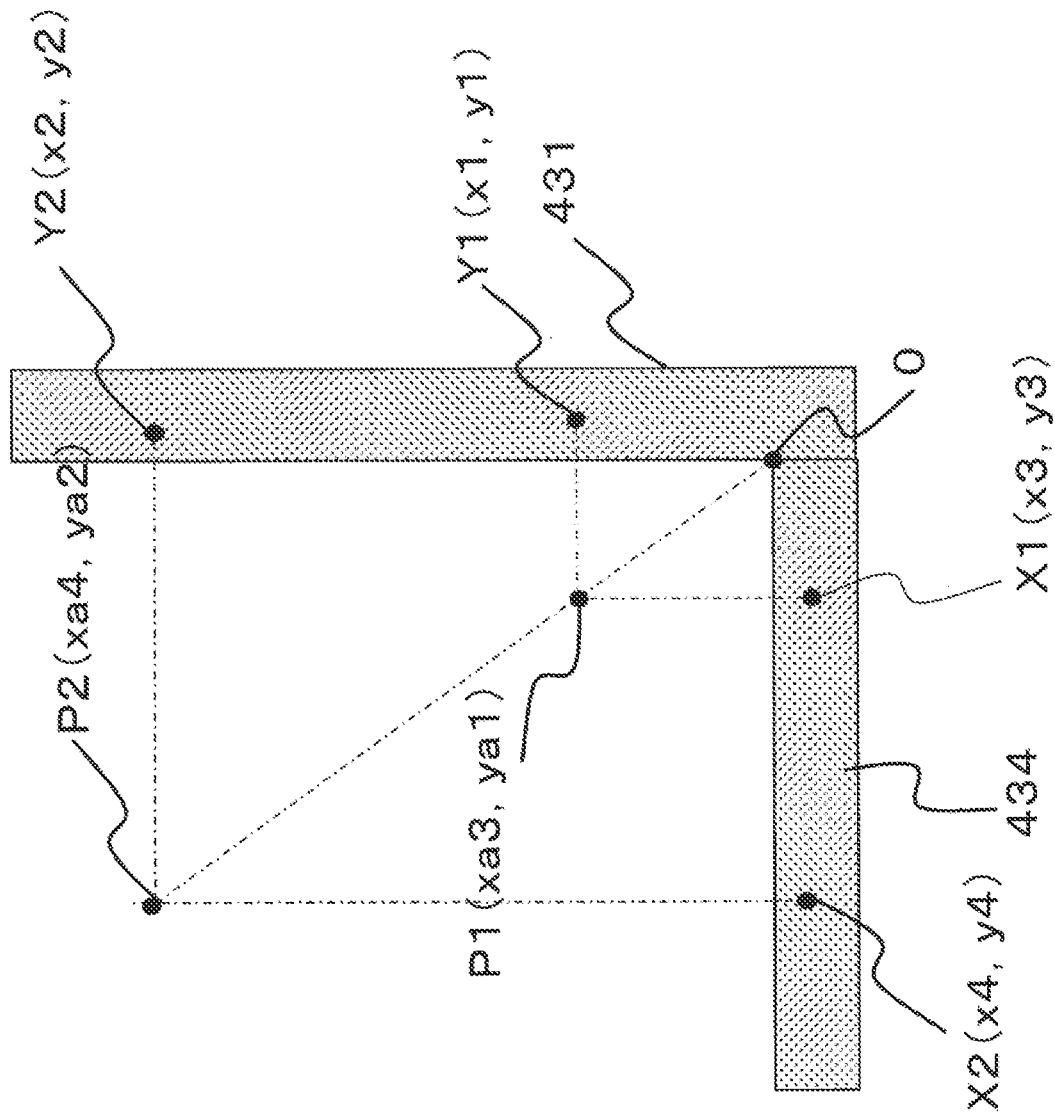
FIG. 18 is a drawing that shows an input signal processing for designating the xy-coordinate with the vertical axis and the horizontal axis of the frame being deemed to be the y-axis and the x-axis respectively.

FIG. 17 is a drawing that shows a hardware configuration of the wearable information terminal shown in FIG. 16. FIG. 18 is a drawing that shows an input signal processing for designating the xy-coordinate with the vertical axis and horizontal axis of the frame being deemed to be the y-axis and the x-axis respectively. As shown in FIG. 17, in the wearable information terminal 1a, each of contact detection units 431 and 432 is disposed in each vertical side (the vertical side means a side where the axial direction of the side agrees to the vertical direction of the letters displayed on the screen) of the quadrangular frame 3, and each of contact detection units 433 and 434 is disposed in each lateral side (the lateral side means a side where the axial direction of the side agrees to the lateral direction of the letters displayed on the screen).

As shown in FIG. 18, when the operation conversion unit 22 acquires an input signal showing that a point X1 (x3, y3) on the contact detection unit 434 and a point Y1 (x1, y1) on the contact detection unit 431 have been touched simultaneously, the operation conversion unit 22 generates an operation signal showing that a coordinate P1 (xa3, ya1) on the screen corresponding to an x-coordinate x3 of the point X1 and a y-coordinate y1 of the point Y1 has been designated. Thereafter, based on the time series change of the input signals acquired from each of the contact detection units 431, 434 outputted accompanying transit of each of the touch positions X1, Y1 to the touch positions X2 (x4, y4), Y2(x2, y2), it is determined that the selected position within the screen 2 has changed to P2 (xa4, ya2).

The operation conversion unit 22 calculates the distance from a predetermined origin O to P1 and the distance from the origin O to P2, and calculates (OP1/OP2) as an enlargement factor. The operation conversion unit 22 outputs the enlargement factor to the display control unit 23. According to this enlargement factor, the display control unit 23 displays a rectangular region including the diagonal line OP1 in an enlarged view. Further, although an example of enlarging display was shown in FIG. 17, when P2 is closer to the origin O compared to P1, contractive display is also possible.

In the present example, when the operation conversion unit 22 acquires an input signal showing that each of two different contact detection units for example 431, 434 has detected the contact operation of the user, the operation conversion unit 22 specifies the coordinate of one point on the screen based on these two input signals. Also, when the operation conversion unit 22 acquires an input signal showing that each of two different contact detection units has detected operation of continuously changing the contact position after detection of the contact operation of the user, the operation conversion unit 22 generates an operation signal for enlarging (or contracting) the screen according to the point movement amount from the first point P1 on the screen specified when the contact operation of the user is detected first to the second point P2 on the screen specified when change of the contact position of the user finished, and the display control unit 23 executes enlarging display or contracting display of the screen according to the operation signal.

Although the map display was exemplified in the present example, the present invention is not limited to this as a matter of course, and other applications are also possible. Further, although explanation was made exemplifying the operation using two vertical and horizontal sides in the present example, operations utilizing three sides or four sides are also possible. In those cases, such method and the like are possible for example that, when a multi-screen is displayed on the screen 2, a touch sensor and the like that can control each screen independently are operated utilizing three sides or four sides.

(Example of Co-Using Pressure-Sensitive Sensor)

Figure 19:
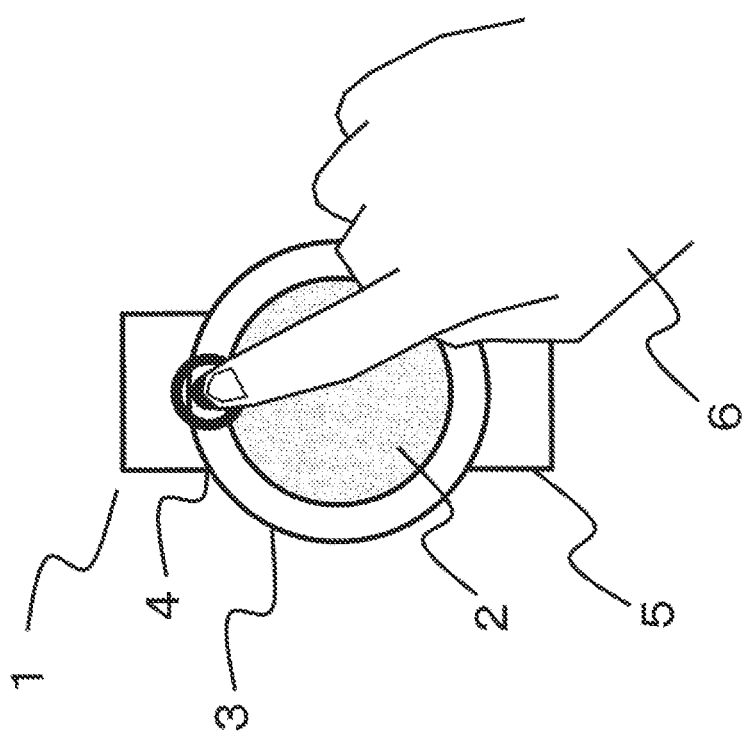
FIG. 19 is a drawing that shows an operation example of a wearable information terminal using a pressure-sensitive sensor as the contact detection unit.

FIG. 19 shows an operation example of a wearable information terminal using a pressure-sensitive sensor as the contact detection unit 4. The wearable information terminal 1*b* can detect intensity of touch by using a pressure-sensitive sensor as the contact detection unit 4. Also, by strong pressing, determination operation for example can be inputted. There is such use method that determination operation is inputted by pressing the frame 3 after selecting a specific position by the method described in each example explained above.

Also, when the contact detection unit 4 is not used as a pressure-sensitive sensor, it is also possible to be implemented by other methods that a physical button is disposed and determination operation is inputted by pressing down the button, and so on.

Figure 20:
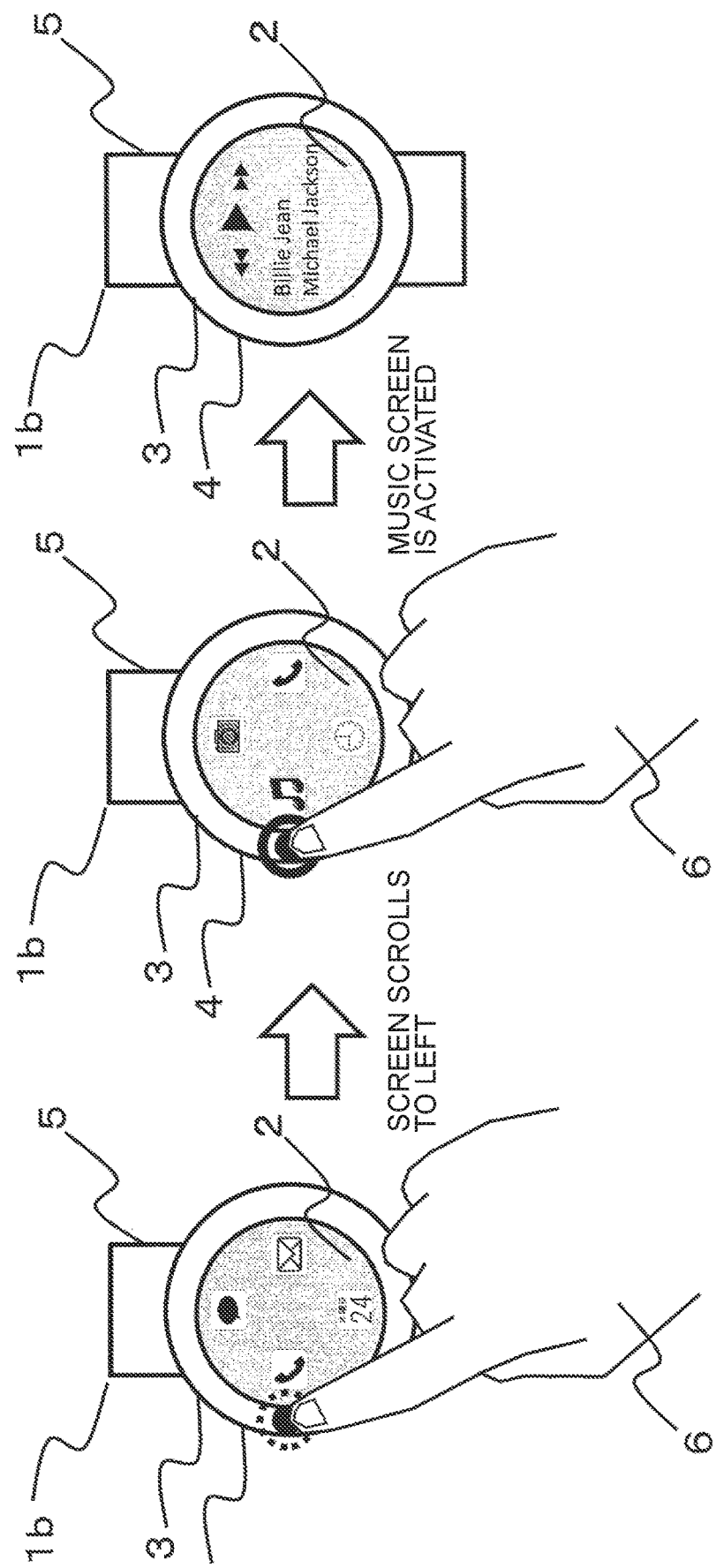
FIG. 20 is a drawing that shows another operation example of a wearable information terminal using a pressure-sensitive sensor as the contact detection unit.

FIG. 20 is a drawing that shows another operation example of the wearable information terminal 1*b* using a pressure-sensitive sensor as the contact detection unit 4. For example, screen operation of the screen scroll and the like is executed when the frame 3 is pressed weakly (the left drawing of FIG. 20: the screen scrolls to the left), and determination operation is inputted when the frame 3 is pressed strongly (the center drawing of FIG. 20). In the example of FIG. 20, by selecting a music screen and executing determination operation, the music screen is activated (the right drawing of FIG. 20).

Figure 21:
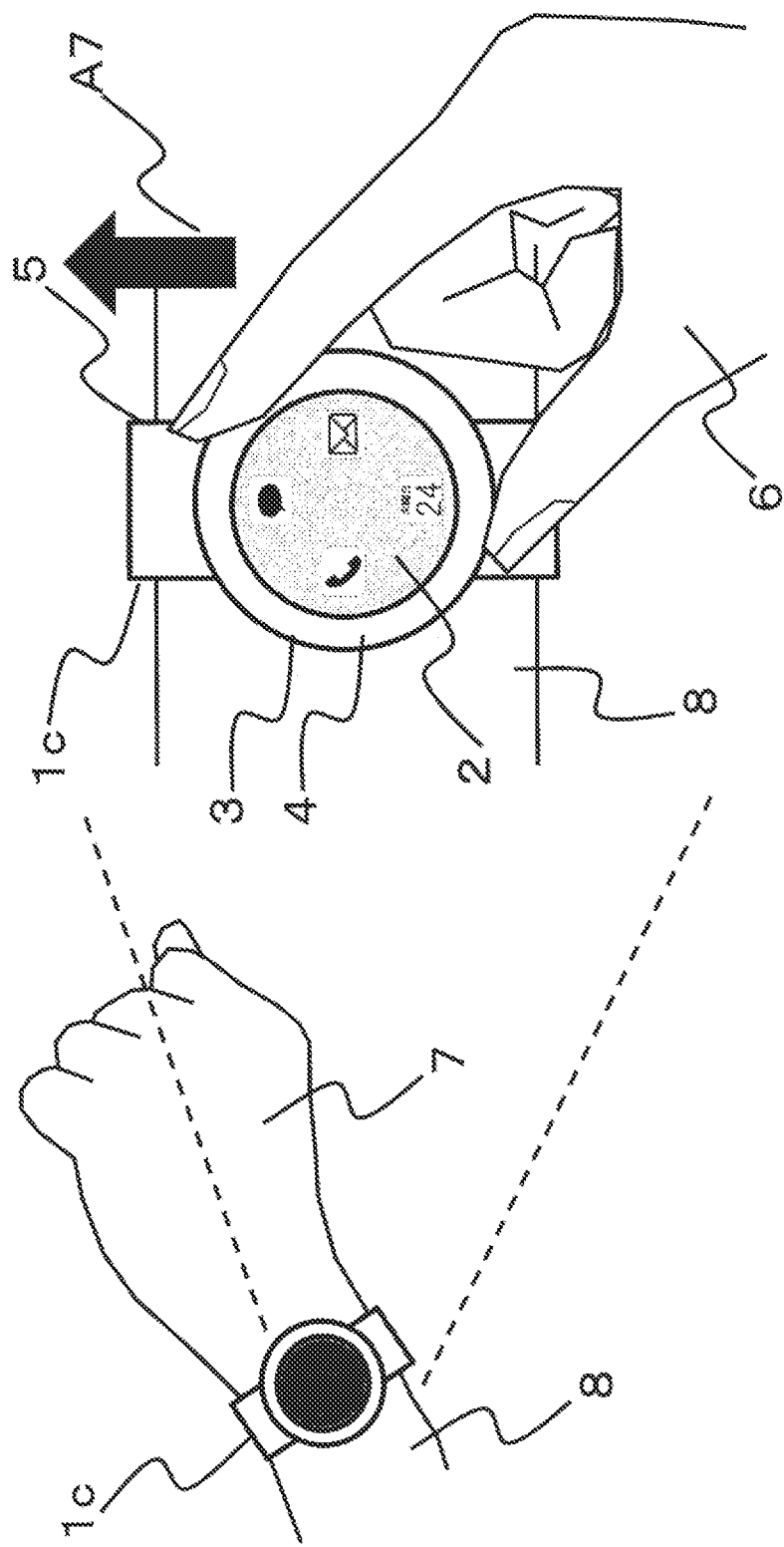
FIG. 21 is a drawing that shows an operation example of a wearable information terminal including a pressure-sensitive sensor on the bottom surface.

FIG. 21 is a drawing that shows an operation example of a wearable information terminal 1*c* including a pressure-sensitive sensor on the bottom surface. For example, the contact detection units 4 are disposed not only on the surface of the frame 3 (in the periphery of the screen 2) but also in a portion contacting (a part of) the body of the wearer out of the bottom surface 3*a* of the frame 3. The hardware configuration of disposing a pressure-sensitive sensor on the bottom surface 3*a* of the frame 3 has been already explained using FIG. 3 (*b*). As shown in FIG. 21, screen operation such as a scroll of the screen 2 upward, moving the pointer icon 100 upward, and so on is allowed by that the user pinches the frame 3 and presses the frame 3 to the upper side (arrow A7) for example toward a part of the body (the arm in the drawing) that contacts the wearable information terminal 1*c*.

Figure 22:
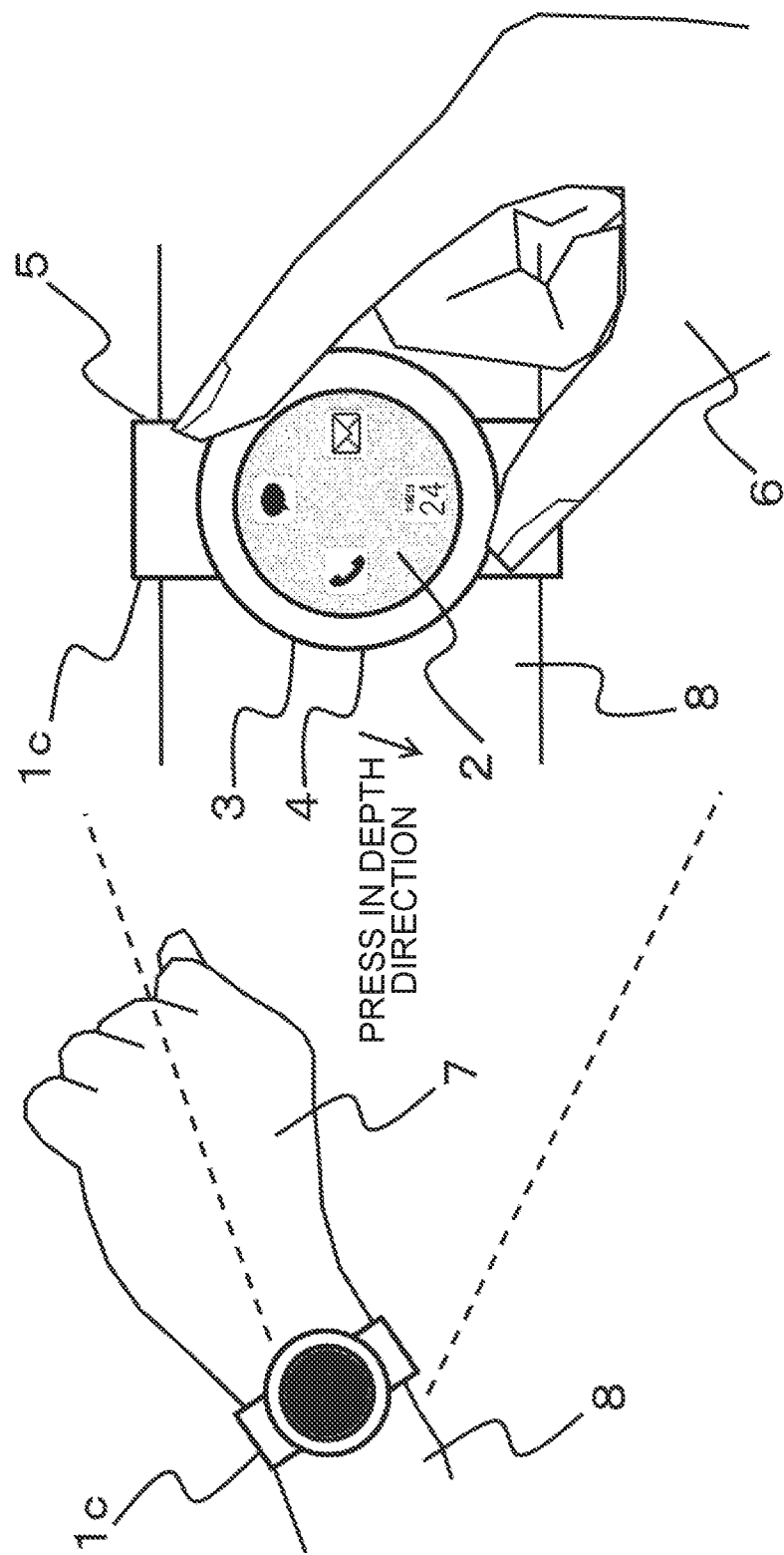
FIG. 22 is a drawing that shows another operation example of a wearable information terminal including a pressure-sensitive sensor on the bottom surface.

Also, FIG. 22 is a drawing that shows another operation example of the wearable information terminal 1*c* including a pressure-sensitive sensor on the bottom surface. As shown in FIG. 22, determination operation can be inputted by that the user pinches the frame 3, and presses the frame 3 to the depth direction for example (equivalent to a motion of pressing the frame 3 to the arm of the user) toward a part of the body (the arm in the drawing) that contacts the wearable information terminal 1*c*.

(Telephone Application)

FIG. 23 is a drawing that shows an operation example in a telephone application. With respect to the wearable information terminal 1 of FIG. 23, the periphery of the frame 3 is separated into 12, and the contact detection unit 4 is disposed for each of the separated region of the frame 3. Each separated region is arranged so as to correspond to the position where 1 to 12 of the dial plate of a watch are disposed. That is to say, the frame 3 of a wearable information terminal 1*d* is deemed to be a dial plate of a watch, a contact detection unit corresponding to 1 of the dial plate outputs an input signal of 1 when the touch motion is detected, and a contact detection unit of the position corresponding to each of 2, 3, . . . 9 of the dial plate outputs an input signal of each of 2, 3, . . . 9 in a similar manner. Also, it may be configured that a contact detection unit of the position corresponding to 10 of the dial plate outputs an input signal of 0 of a numerical character when the touch motion is detected. Further, with respect to a contact detection unit of the position corresponding to 11 of the dial plate, ENTER key and a symbol # may be allocated. Also, when the wearable information terminal is made to function as an electronic calculator, the decimal point may be allocated.

When the wearable information terminal is used for a telephone application, as shown in FIG. 23, a phone call can be transmitted by operating the frame 3. For example, when it is intended to make a phone call to "119", by tapping the corresponding parts of "1" and "9" of the frame 3 (the left drawing of FIG. 23), a phone call to "119" can be transmitted (the right drawing of FIG. 23).

Also, the phone number is not necessarily be of three digits. Further, the phone number is not the must, and dialing may be by abbreviated dial for example which has been registered in the telephone directory beforehand (for example, the phone number of the one's house is registered at the abbreviated dial number "1", and phone call is transmitted to the one's house when "1" is tapped, and so on). Also, whether the numerical character is displayed on the screen 2 is not the object, and the operation described above only has to be possible in all cases. Further, the operation described above should be allowed even when the shape of the screen 2 is not circular but is triangular, quadrangular, or polygonal having more sides. In addition, the user is to be capable of uniquely setting an input method for "0" that does not exist on the dial plate of a watch but exists in the phone number and for "10", "11", "12", and the like that exist on the dial plate of a watch but do not exist in the phone number to the contrary. For example, "10" of the dial plate of a watch may be used as a substitute for "0" of the phone number, and "11" and "12" of the dial plate of a watch may be allocated for redialing, message-recording telephone, and the like.

Also, as mentioned above, in the calculator application (electronic calculator application) also, the calculation process such as the four basic arithmetic operations can be executed by operation of touching the frame by allocating numerical characters of 1 to 0 to the frame 3.

(Scroll of Screen)

Figure 24:
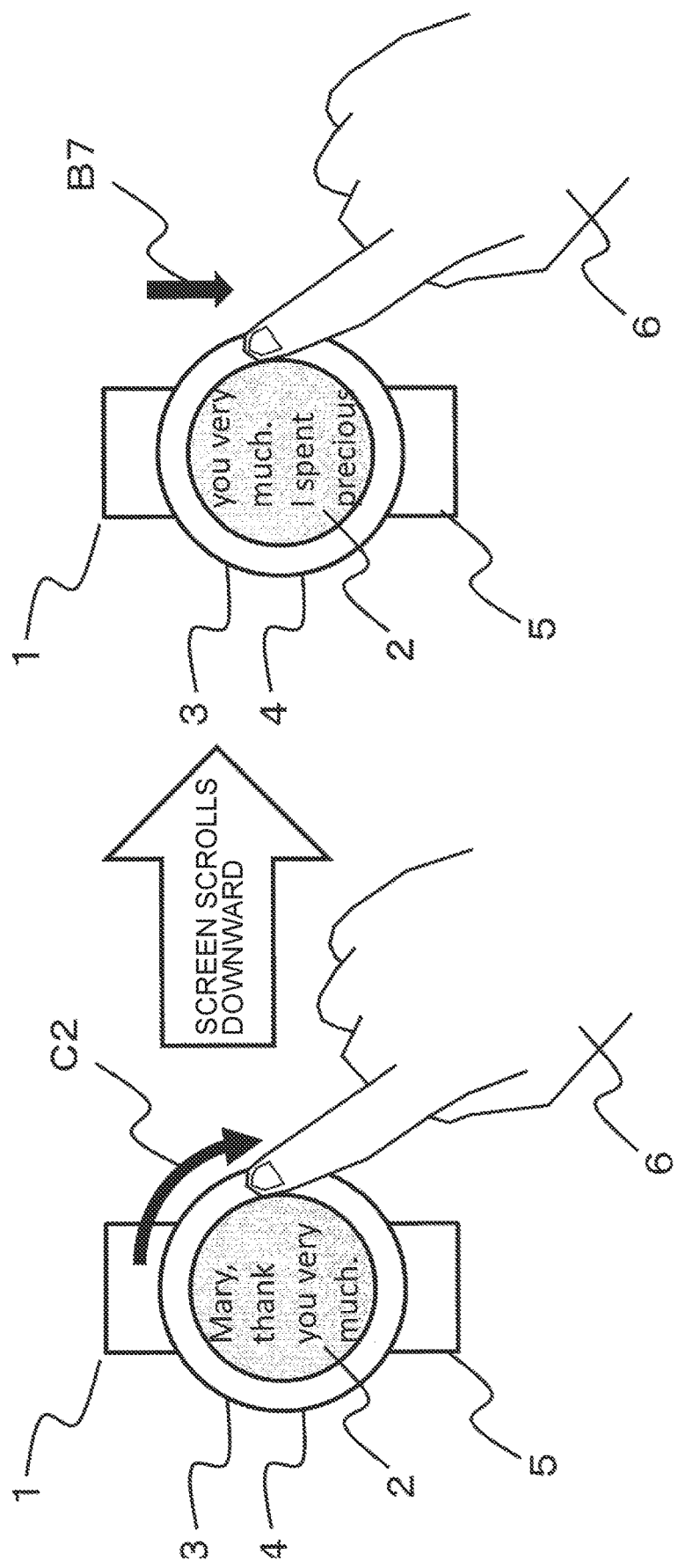
FIG. 24 is a drawing that shows a frame operation example (scroll of the screen).

FIG. 24 is a drawing that shows a frame operation example (scroll of the screen). It is configured that, when such screen as an e-mail for example not fitted into one screen is to be displayed, as shown in FIG. 24, the screen can be scrolled downward (arrow B7) (the right drawing of FIG. 24) by tracing the frame 3 of the wearable information terminal 1 clockwise (arrow C2 direction) by the finger (the left drawing of FIG. 24). Thereby, because it is not necessary to touch the screen 2 directly as done in the past, the screen can be operated while confirming the displayed content. As the applications where the effects of the present embodiment can be expected, a memorandum note, telephone directory, and the like for example can be cited in addition to the e-mail. The frame operation of the present example is achieved by that the operation conversion unit 22 receives a position where the contact detection unit 4 has been touched beforehand and the time series change of the input signal thereafter (an input signal showing movement along the peripheral direction), and the input signal is converted to a screen scroll signal of the frame and is outputted to the display control unit 23.

FIG. 25 is a drawing that shows another example of the frame operation (scroll of the screen). By detecting the position of starting to trace the frame 3 by the contact detection unit 4, movement of the finger is reflected to the screen operation. For example, as shown in FIG. 25 (*a*), by starting tracing from a position equivalent to the vicinity of 12 o'clock of a so-called analog watch of the frame 3 (arrow C3), the screen can be scrolled vertically. Alternatively, as shown in FIG. 25 (*b*), by starting tracing from a position equivalent to the vicinity of 9 o'clock (arrow C4), the screen can be scrolled to the left and right. The frame operation of the present example is achieved by that the operation conversion unit 22 acquires a position where the contact detection unit 4 is touched first and an input signal outputted accompanying a tracing motion thereafter, determines the direction of the touching motion based on the time series change of the input signal (an input signal showing movement along the peripheral direction), decides the screen scroll direction according to the touch motion, generates a signal of the screen scroll to the direction, and outputs the signal to the display control unit 23.

FIG. 26 and FIG. 27 are drawings that show another example of the frame operation (scroll of the screen). A scroll of the screen 2 downward (arrow B8 direction) as shown in FIG. 26 (*a*) can be achieved by touching the lower part of the frame 3. Also, a scroll of the screen 2 to the upper right (arrow B9 direction) as shown in FIG. 26 (*b*) can be achieved by touching the upper right part of the frame 3.

It may be configured that the displayed screen is scrolled to the right (arrow B10 direction) by touching the right side of the frame 3 as shown in FIG. 27. Frame operation of FIG. 26 and FIG. 27 can be achieved by that the frame 3 is separated in all directions of 360° radially from the center of the screen 2 regardless of the shape such as the circular shape or the quadrangular shape for example, and the operation conversion unit 22 acquires an input signal showing the touch position of the contact detection unit 4, converts the input signal to a screen scroll signal for a scroll of the screen along a line that connects the center of the screen 2 and the touch position to each other, and outputs the screen scroll signal to the display control unit 23.

(Sound Controller)

FIG. 28 is a drawing that shows a frame operation example in a sound controller screen. With respect to a sound controller in a reproduction application for a motion picture and music for example, it is known that, in general, the reproduction position in the music, the sound volume, and the like can be selected using a bar displayed. However, in a small screen, it is hard to operate the bar displayed smaller by the fingertip. Therefore, it may be configured to allow an operation such as shifting the selection position on a bar 60 of a sound controller according to the tracing amount of the operation conversion unit 22 by a tracing operation of the frame 3, and selecting the music, sound volume, and reproduction position in the music.

(Screen Separation)

FIG. 29 is a drawing that shows a frame operation (screen separation) of the wearable information terminal 1. Plural contact detection units 4 are disposed in the frame 3, or one contact detection unit 4 is disposed and the operation conversion unit 22 executes plural separation control logically, and each of contact detection units 4*a*, 4*b* is made controllable independently. For example, in the wearable information terminal 1 of FIG. 29, the contact detection units are disposed annually (refer to FIG. 6) for the frame 3 having an annular shape. When the direction orthogonal to the wearing section 5 is defined as the screen horizontal direction, the contact detection unit is to be separately disposed in each of the upper and lower half circles obtained by dividing the frame 3 in the screen horizontal direction, and each of the contact detection units can be independently controlled. For example, in a case where the screen 2 is vertically separated into 2, in FIG. 6, the operation conversion unit 22 defines that the contact detection units 401, 402, 403, 413, 414, and 415 (these are collectively referred to as a contact detection unit 4*a*1) are used for frame operation of the upper screen, and an input signal showing that the contact detection unit 4*a*1 has been touched is converted to an operation signal for the upper screen. Also, an input signal showing that the contact detection units 404, 405, 406, 407, 408, and 409 (these are collectively referred to as a contact detection unit 4*a*2) have been touched is converted to an operation signal for the lower screen.

The wearable information terminal 1 configured thus has effects described below. When receipt of the phone call is notified while the user browses a map for example, two or more screens are to be displayed simultaneously on the screen 2 of the wearable information terminal 1 (the left drawing of FIG. 29). When the telephone motion is to be selected, the touch sensor disposed on the screen 2 may be pressed, or the contact detection unit 4*a*2 may be pressed to input the determination key. After holding up the phone thus to bring up the communication state (the center drawing of FIG. 29), if it is intended to browse a map simultaneously in an enlarged view, enlarging operation can be inputted (the left drawing of FIG. 29) by tracing the contact detection unit 4*a*1 by the finger (arrow C5), and so on. That is to say, the effect by the present example is that proper independent control matching each displayed screen is possible even in a multi-screen because the contact detection units 4*a*1, 4*a*2 are separately disposed in the frame 3.

Further, although the present example was explained exemplifying both of "holding up the received phone call" and "displaying the map in an enlarged view", it is a matter of course that the present invention is not limited to them, and other screen operation under a situation of requiring a multi-screen or multi-motion is also possible.

Figure 31:
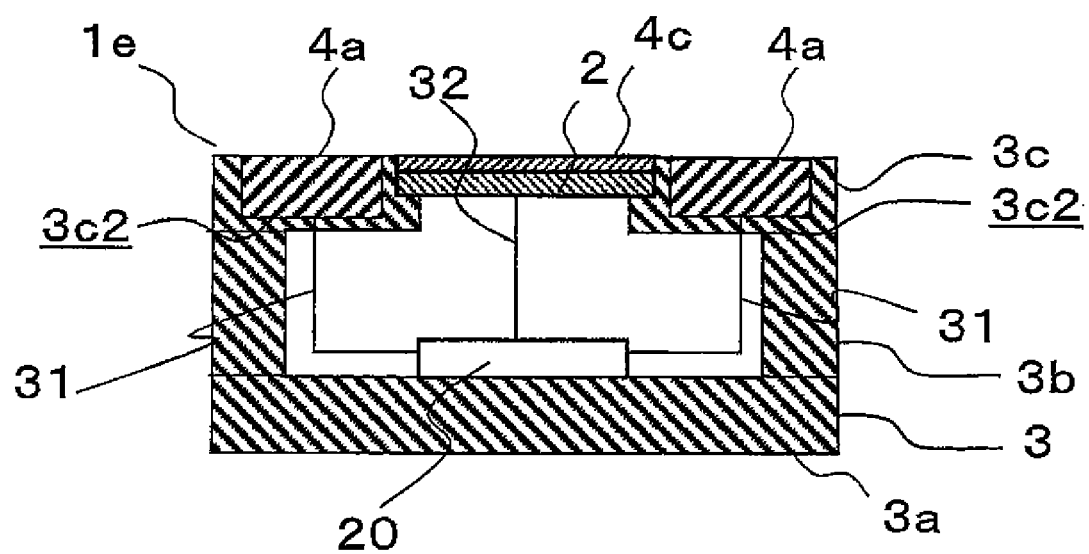
FIG. 31 is a schematic configuration drawing of a wearable information terminal receiving a return operation from a malfunction.

FIG. 30 and FIG. 32 are drawings that show a return operation from a malfunction of a wearable information terminal 1. Also, FIG. 31 is a schematic configuration drawing of a wearable information terminal 1*e* receiving a return operation from a malfunction. "Malfunction" explained here is to mean that the displayed content does not transit as per the intention of the user with respect to operation using the finger such as touching and tapping. When the displayed content has not transited as per the intention of the user, by inputting "turning back" operation (return operation" by some other operation, the displayed content can be returned to the original screen.

As concrete operation by the user, the frame 3 is double-tapped as shown in FIG. 30 (*a*). When the contact detection unit 4 detects the double tap and outputs an input signal showing the double tap to the operation conversion unit 22, the operation conversion unit 22 converts the double tap input signal to a return signal, and outputs the return signal to the display control unit 23. The display control unit 23 reads the last screen information stored in the screen management information storage unit 25, and makes the screen transit to the last state based on the last screen information.

Instead of double tapping, in a case of the wearable information terminal 1*e* obtained by laminating a touch panel 50 on the screen 2 (refer to FIG. 31), tapping of the screen 2 may be made return operation (FIG. 30 (b)).

Also, tracing operation of the screen 2 along with the wearing section 5 (FIG. 32 (a), arrow D1) may be made return operation. In this case, it is possible that a contact detection unit is disposed further in a peripheral part of the frame 3 of the wearing section 5 beforehand, and, when the operation conversion unit 22 acquires an input signal of the contact detection unit (not illustrated) disposed in the wearing section 5, the input signal is converted to a return signal.

When operation of tracing the screen 2 along with the wearing section 5 is executed, the contact detection unit 4 disposed across the screen 2 detects a touch motion within a predetermined time. In this regard, it is also possible that, when the contact detection unit 4 disposed across the screen 2 detects the touch motion within a time that is set for determination to be the motion time of the finger tracing the screen 2 along with the wearing section 5 (within 1 second for example), the operation conversion unit 22 converts an input signal to a return signal, the input signal being based on the touch motion.

Further, it is also possible that a physical return operation button 19 is disposed in the frame 3 as shown in FIG. 32 (b), "turning back" operation is allocated to the return operation button 19, and the operation conversion unit 22 acquires an input signal of the return operation button 9 and coverts the input signal to a return signal.

Further, although the present example was explained citing several cases, it is a matter of course that the present invention is not limited to them, and it is needless to say that the operation content for inputting "return back" changes according to an application having been activated by a user.

According to the present embodiment, by using the frame 3 as an operation member, it is possible to directly touch the screen by the finger at the time of operation, and to execute screen operation while preventing that the screen is hidden by the finger and becomes invisible. Also, even when a specific position of the screen is smaller than the finger, because screen operation can be executed by operating a frame larger than the specific position without directly touching the specific position of the screen, operability improves. Further, because it is not necessary to touch the screen directly, finger mark staining caused by touching the screen can be prevented.

The present invention is not limited to the embodiments described above, and includes various modifications other than the modifications described above. For example, the embodiments described above were explained in detail for the purpose of easy understanding of the present invention, and are not necessarily limited to those including all configurations explained. Also, a part of a configuration of an embodiment can be replaced with a configuration of another embodiment, and a configuration of an embodiment can be added with a configuration of another embodiment. Further, with respect to a part of a configuration of each embodiment, addition, deletion, and replacement of other configurations are possible.

Further, a part or all of each of the configurations, functions, processing units, processing devices, and the like described above can be achieved by hardware by designing by an integrated circuit and the like for example. Also, each of the configurations, functions, and the like described above can be achieved by software by that a processor interprets and executes programs achieving each function.

For example, the screen operation mentioned in the present description includes all kinds of content which is difficult to handle because the icon and the like of an operation object displayed on the screen 2 has a generally same size compared to a part of the body represented by the finger and the like for operation. The content which is difficult to handle is for example a scroll operation of the screen, a selection of the icon, inputting, selection, and the like. Further, although the embodiments described above were explained using the examples of a wearable information terminal of a wrist watch type, a shape like a finger ring type for example is also possible. Furthermore, although the screen 2 and the frame 3 of the wearable information terminal 1 were explained citing the examples of the circular shape and the quadrangular shape, it is a matter of course that the shape is not limited to them, and the shape of the triangular and other polygonal shapes are also possible.

Figure 33:
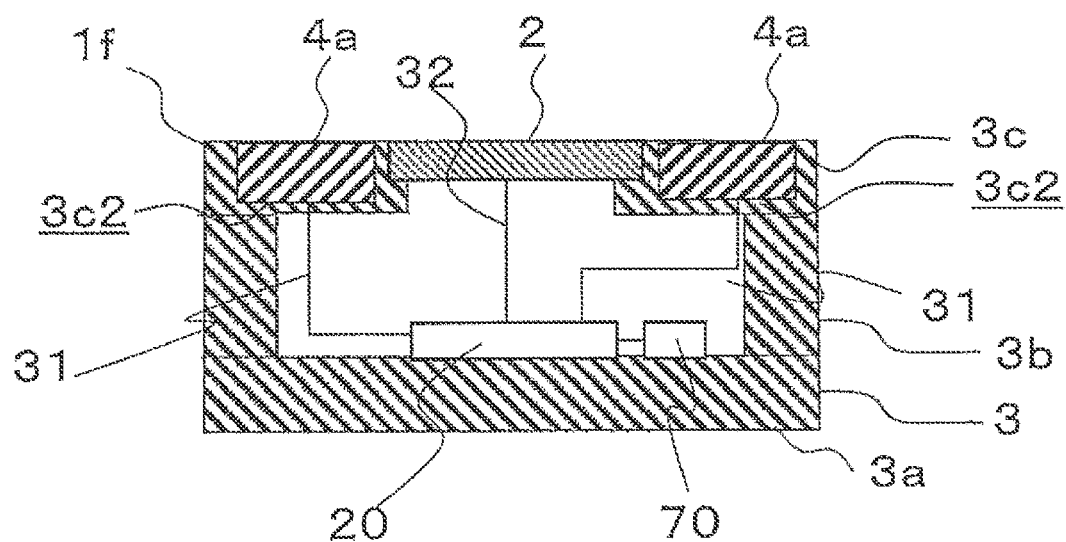
FIG. 33 is a schematic configuration drawing of a wearable information terminal mounting a gyroscope sensor.

Also, although the embodiments described above were explained exemplifying the touch sensor and the pressure-sensitive sensor for the contact detection unit 4, it is also possible to dispose a gyroscope sensor instead for example (refer to FIG. 33). When the touch sensor and the pressure-sensitive sensor are disposed, the wearable information terminal 1 of a wrist watch type for example is required to be operated using the finger of the hand that does not wear the wearable information terminal 1 and it is necessary to use both hands; however, a gyroscope sensor 70 is mounted within the frame 3 and is connected to the controller 20 as shown in FIG. 33. When the change amount of the angular velocity of a wearable information terminal if is detected and the operation conversion unit 22 converts this change amount of the angular velocity to an operation signal, operation only by an arm that wears the wearable information terminal if becomes possible, therefore another hand becomes free, and the degree of freedom of the user improves. As an operation example using a gyroscope sensor, it is also possible to move an arm wearing the wearable information terminal 1 so that the wearable information terminal if tilts downward to the right (downward to the left), and to convert the change amount of the angular velocity at that time to an operation signal for a scroll to the right direction of the screen (to the left direction of the screen). In this case, because the gyroscope sensor achieves a function of detecting the user operation, the gyroscope sensor functions as an operation detection unit. Further, it may be configured that only a pressure-sensitive sensor (bottom surface contact detection unit) is provided on the bottom surface bottom surface of the frame 3 as the operation detection unit.

REFERENCE SIGNS LIST

1 . . . Wearable information terminal
2 . . . Display unit
3 . . . Frame
4 . . . Contact detection unit
4a . . . Contact detection unit 1
4b . . . Contact detection unit 2
5 . . . Wearing section
6 . . . Operating hand of user
7 . . . Hand wearing wearable information terminal
8 . . . Arm wearing wearable information terminal
19 . . . Return operation button
100 . . . Pointer icon

The invention claimed is:

1. A wearable information terminal that can be worn by a user, comprising:
a display including a screen;
a controller configured to execute display processing onto the screen; and a plurality of operation detectors configured to detect input operations performed with respect to the controller, wherein the wearable information terminal further comprises a frame that is configured separately from the screen and holds the screen, wherein the operation detectors are configured to detect a contact operation of the user, wherein the operation detectors are configured separately and are disposed in the frame along the outer periphery of the screen, and wherein the controller includes:
an operation converter that recognizes from which operation detector an input signal is received, and generates an operation signal dependent on each operation detector, respectively;
a screen management information storage that, for separate regions of the screen, stores screen separation information in which each separate region is associated with each of the operation detectors, respectively;
the operation converter that acquires, when the operation detector detects the contact operation of the user, the input signal including information showing the operation detector that has detected the contact operation of the user and a detection signal of the contact operation, refers to the screen separation information to determine the separate region to which the operation is performed, and generates an operation signal based on the determination result; and
a display controller that outputs a display control signal for the screen based on the operation signal.

2. The wearable information terminal according to claim 1, wherein the operation detector is configured of a touch sensor or a pressure-sensitive sensor.

3. The wearable information terminal according to claim 1, further comprising
a bottom surface operation detector configured of a pressure-sensitive sensor in the frame on a bottom surface that is on an opposite side of a surface where the screen is disposed.

4. The wearable information terminal according to claim 1,
wherein a gyroscope sensor is further provided as the operation detector, and
the controller further includes an operation converter that converts an angular velocity signal outputted by the gyroscope sensor to an operation signal of a user with respect to the wearable information terminal.

5. The wearable information terminal according to claim 1,
wherein the frame surrounds an outer periphery of the screen.

6. A wearable information terminal that can be worn by a user, comprising:
a display including a screen;
a controller configured to execute display processing onto the screen; and
a plurality of operation detectors configured to detect input operations performed with respect to the controller,
wherein the wearable information terminal further comprises a frame that is configured separately from the screen and holds the screen,
wherein the operation detectors are disposed in the frame and are configured to detect a contact operation of the user, and
wherein the controller includes:
an operation information storage storing operation information in which a kind of application software executed in the wearable information terminal is associated with an operation content shown by the contact operation of the user in each application software;
an operation converter that converts, when an input signal showing that the operation detector has detected the contact operation is acquired, the input signal to an operation signal that shows the operation content based on the operation information; and
a display controller that outputs a display control signal for executing display control of the screen according to the operation signal.

7. The wearable information terminal according to claim 6,
wherein the controller further includes a screen management information storage storing last screen information that shows a last screen before the screen transits on the screen,
when the operation detector detects that the user has executed operation for inputting a command for returning to the last screen, the operation converter converts an input signal from the operation detector to an operation signal for returning to the last screen, and
the display controller reads the last screen information from the screen management information storage and changes the screen to a display of the last screen.

8. A wearable information terminal that can be worn by a user, comprising:
a display including a screen;
a controller configured to execute display processing onto the screen; and
a plurality of operation detectors configured to detect input operations performed with respect to the controller,
wherein the wearable information terminal further comprises a frame that is configured separately from the screen and holds the screen,
wherein the operation detectors are configured to detect a contact operation of the user,
wherein the operation detectors are configured separately and are disposed in the frame along the outer periphery of the screen,
wherein the controller includes an operation converter that recognizes from which of the operation detectors an input signal is received, and generates an operation signal dependent on each operation detector, respectively,
wherein, when an input signal showing that each of two different operation detectors has detected the contact operation of the user is acquired, the operation converter specifies a coordinate of one point on a screen based on these two input signals, and
wherein, when an input signal showing that an operation of changing the contact position is detected continuously after each of the two different operation detectors has received the contact operation of the user is acquired, the operation converter generates an operation signal for enlarging or contracting the screen according to a point moving amount from a first point on the screen determined when the contact operation of the user was detected first to a second point on the screen determined when change of a contact point of the user finished.

9. A wearable information terminal that can be worn by a user, comprising:
   a display including a displayed screen;
   a controller configured to execute display processing onto the displayed screen; and
   a plurality of operation detectors configured to detect input operations performed with respect to the controller,
   wherein the wearable information terminal further comprises a frame section that is a non-displayed area and disposed to surround an outer periphery of the displayed screen,
   wherein the operation detectors are configured to detect a contact operation of the user,
   wherein the operation detectors are configured separately and are disposed in the frame section along the outer periphery of the displayed screen, and
   wherein the controller includes:
      an operation converter that recognizes from which operation detector an input signal is received, and generates an operation signal dependent on each operation detector, respectively;
      a screen management information storage that, for separate regions of the displayed screen, stores screen separation information in which each separate region is associated with each of the operation detectors, respectively;
   the operation converter that acquires, when the operation detector detects the contact operation of the user, the input signal including information showing the operation detector that has detected the contact operation of the user and a detection signal of the contact operation, refers to the screen separation information to determine the separate region to which the operation is performed, and generates an operation signal based on the determination result; and
   a display controller that outputs a display control signal for the displayed screen based on the operation signal.

* * * * *